(12) United States Patent
Wang et al.

(10) Patent No.: US 12,013,596 B2
(45) Date of Patent: *Jun. 18, 2024

(54) GLASSES

(71) Applicant: SHENZHEN SHOKZ CO., LTD., Guangdong (CN)

(72) Inventors: Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 740 days.

This patent is subject to a terminal disclaimer.

(21) Appl. No.: 17/138,956

(22) Filed: Dec. 31, 2020

(65) Prior Publication Data

US 2021/0124184 A1 Apr. 29, 2021

Related U.S. Application Data

(63) Continuation of application No. PCT/CN2019/102395, filed on Aug. 24, 2019.

(30) Foreign Application Priority Data

Aug. 24, 2018 (CN) .......................... 201810975515.1

(51) Int. Cl.
*G02C 11/00* (2006.01)
*A61B 3/02* (2006.01)
(Continued)

(52) U.S. Cl.
CPC .......... *G02C 5/2254* (2013.01); *G02C 5/001* (2013.01); *G02C 5/143* (2013.01); *G02C 5/16* (2013.01);
(Continued)

(58) Field of Classification Search
CPC ............ A61B 3/103; A61B 3/113; A61B 3/14; A61B 3/1225; A61B 3/125; A61B 3/024;
(Continued)

(56) References Cited

U.S. PATENT DOCUMENTS 2,327,320 A 8/1943 Shapiro
4,902,120 A 2/1990 Weyer
(Continued)

FOREIGN PATENT DOCUMENTS

CN 2639920 Y 9/2004
CN 102141688 A 8/2011
(Continued)

OTHER PUBLICATIONS

International Search Report in PCT/CN2019/102394 dated Nov. 28, 2019, 8 pages.
(Continued)

*Primary Examiner* — Dawayne Pinkney
(74) *Attorney, Agent, or Firm* — METIS IP LLC

(57) ABSTRACT

The present disclosure embodiment may disclose a glasses. The glasses may include a glasses frame and two speakers. The glasses frame may include a glasses rim and two glasses temples. The two glasses temples may be rotatably connected to the glasses rim, respectively. The two speakers may be connected to the two glasses temples via hinge components of the two glasses temples, respectively. The hinge components may be rotatable to change a position of each of the speakers relative to one of the glasses temples. The two speakers may include an earphone core and an earphone housing. The earphone housing may include a housing panel facing a human body and a housing back opposite to the housing panel. At least one of the glasses temples may include a control circuit or a battery. The control circuit or the battery may drive the earphone core to
(Continued)

vibrate to generate sound. A vibration of the earphone core may result in vibrations of the housing panel and the housing back. The vibration of the housing panel may have a first phase, and the vibration of the housing back may have a second phase, vibration frequencies of the housing panel and the housing back may be in a range of 2000 Hz to 3000 Hz, and an absolute value of a difference between the first phase and the second phase may be less than 60 degrees. In the present disclosure, a function member may be connected to the glasses through the hinge component to expand use of the glasses.

20 Claims, 19 Drawing Sheets

(51) Int. Cl.
A61F 9/02 (2006.01)
G02B 27/01 (2006.01)
G02C 5/00 (2006.01)
G02C 5/14 (2006.01)
G02C 5/16 (2006.01)
G02C 5/22 (2006.01)
G02C 7/02 (2006.01)
H04R 1/02 (2006.01)
H04R 1/10 (2006.01)
H04R 5/033 (2006.01)
H04R 9/02 (2006.01)
H04R 9/04 (2006.01)
H04R 9/06 (2006.01)
G02C 5/20 (2006.01)

(52) U.S. Cl.
CPC .......... *G02C 5/2218* (2013.01); *G02C 5/2227* (2013.01); *G02C 11/10* (2013.01); *H04R 1/025* (2013.01); *H04R 1/028* (2013.01); *H04R 1/1008* (2013.01); *H04R 1/1066* (2013.01); *H04R 5/0335* (2013.01); *H04R 9/025* (2013.01); *H04R 9/045* (2013.01); *H04R 9/06* (2013.01); *G02C 5/20* (2013.01); *H04R 2400/03* (2013.01); *H04R 2460/13* (2013.01); *H04R 2499/10* (2013.01)

(58) Field of Classification Search
CPC ....... A61B 3/1015; A61B 3/107; G02C 11/00; G02C 5/00; G02C 7/02; G02C 5/14; G02C 5/143; G02C 5/16; G02C 11/10; G02C 11/16; H04R 1/10; H04R 1/1008; H04R 1/1016; H04R 1/1066; G02B 27/0103; G02B 27/0172; G02B 27/0149
USPC ............................................ 359/13, 630–636
See application file for complete search history.

(56) References Cited

U.S. PATENT DOCUMENTS

| | | | |
|---|---|---|---|
| 6,850,138 B1 | 2/2005 | Sakai | |
| 7,289,767 B2 | 10/2007 | Li | |
| 8,965,012 B1* | 2/2015 | Dong | H04R 3/00 381/151 |
| 2003/0048913 A1 | 3/2003 | Lee et al. | |
| 2006/0098829 A1 | 5/2006 | Kobayashi | |
| 2008/0013041 A1* | 1/2008 | Chou | G02C 11/06 351/158 |
| 2008/0074609 A1 | 3/2008 | Ifergan | |
| 2009/0190781 A1 | 7/2009 | Fukuda | |
| 2009/0208031 A1 | 8/2009 | Abolfathi | |
| 2009/0285417 A1 | 11/2009 | Shin et al. | |
| 2009/0290730 A1 | 11/2009 | Fukuda et al. | |
| 2010/0322454 A1 | 12/2010 | Ambrose et al. | |
| 2011/0200204 A1 | 8/2011 | Horigome et al. | |
| 2013/0329918 A1* | 12/2013 | Kubba | H04R 1/1016 381/151 |
| 2013/0329919 A1 | 12/2013 | He | |
| 2014/0125942 A1* | 5/2014 | Huang | G02C 5/2209 351/121 |
| 2014/0185822 A1* | 7/2014 | Kunimoto | H04R 1/24 381/74 |
| 2014/0253867 A1 | 9/2014 | Jiang et al. | |
| 2015/0030189 A1 | 1/2015 | Nabata et al. | |
| 2015/0256656 A1 | 9/2015 | Hori | |
| 2015/0257662 A1 | 9/2015 | Lee et al. | |
| 2015/0326967 A1 | 11/2015 | Otani | |
| 2016/0212547 A1* | 7/2016 | Kang | H04R 9/025 |
| 2016/0234613 A1 | 8/2016 | Westerkull | |
| 2016/0246076 A1 | 8/2016 | Wei | |
| 2016/0329041 A1 | 11/2016 | Qi et al. | |
| 2017/0090201 A1 | 3/2017 | Guo | |
| 2018/0132019 A1* | 5/2018 | Riedel | H04R 1/02 |
| 2020/0053449 A1* | 2/2020 | Ito | H04R 1/105 |
| 2020/0336824 A1 | 10/2020 | Zheng et al. | |
| 2020/0344542 A1 | 10/2020 | Liu et al. | |

FOREIGN PATENT DOCUMENTS

| | | |
|---|---|---|
| CN | 201984240 U | 9/2011 |
| CN | 202306037 U | 7/2012 |
| CN | 202364340 U | 8/2012 |
| CN | 103167390 A | 6/2013 |
| CN | 103347235 A | 10/2013 |
| CN | 203786416 U | 8/2014 |
| CN | 204374548 U | 6/2015 |
| CN | 105007551 A | 10/2015 |
| CN | 204887455 U | 12/2015 |
| CN | 205103503 U | 3/2016 |
| CN | 205301727 U | 6/2016 |
| CN | 205720956 U | 11/2016 |
| CN | 205793159 U | 12/2016 |
| CN | 205961389 U | 2/2017 |
| CN | 206061075 U | 3/2017 |
| CN | 206292473 U | 6/2017 |
| CN | 106937221 A | 7/2017 |
| CN | 106954150 A | 7/2017 |
| CN | 106954151 A | 7/2017 |
| CN | 106954153 A | 7/2017 |
| CN | 106974645 A | 7/2017 |
| CN | 206365029 U | 7/2017 |
| CN | 106997107 A | 8/2017 |
| CN | 206387972 U | 8/2017 |
| CN | 206421112 U | 8/2017 |
| CN | 206563855 U | 10/2017 |
| CN | 206640748 U | 11/2017 |
| CN | 206920741 U | 1/2018 |
| CN | 107948881 A | 4/2018 |
| CN | 207424414 U | 5/2018 |
| CN | 207443120 U | 6/2018 |
| CN | 108391188 A | 8/2018 |
| CN | 207718105 U | 8/2018 |
| CN | 207720370 U | 8/2018 |
| CN | 108600920 A | 9/2018 |
| CN | 108776393 A | 11/2018 |
| CN | 108845436 A | 11/2018 |
| CN | 108873372 A | 11/2018 |
| CN | 109061902 A | 12/2018 |
| CN | 109495809 A | 3/2019 |
| CN | 208780924 U | 4/2019 |
| CN | 208780925 U | 4/2019 |
| CN | 208780926 U | 4/2019 |
| CN | 208780932 U | 4/2019 |
| CN | 208847977 U | 5/2019 |
| CN | 208847981 U | 5/2019 |
| CN | 110022516 A | 7/2019 |
| CN | 209184747 U | 7/2019 |
| CN | 209267805 U | 8/2019 |
| EP | 2011367 B1 | 12/2014 |
| JP | S59161928 A | 9/1984 |
| JP | 2006157318 A | 6/2006 |
| JP | 2006332715 A | 12/2006 |

(56) References Cited

FOREIGN PATENT DOCUMENTS

| | | | | |
|---|---|---|---|---|
| JP | 2007251358 A | 9/2007 | | |
| JP | 2013055571 A | 3/2013 | | |
| JP | 2014072555 A | 4/2014 | | |
| WO | 9623373 A1 | 8/1996 | | |
| WO | 2004095878 A2 | 11/2004 | | |
| WO | 2006023341 A2 | 3/2006 | | |
| WO | 2007070508 A2 | 6/2007 | | |
| WO | 2007133055 A1 | 11/2007 | | |
| WO | WO-2007140368 A3 * | 11/2008 | ........... | A61C 8/0098 |
| WO | 2015115693 A1 | 8/2015 | | |

OTHER PUBLICATIONS

International Search Report in PCT/CN2019/102377 dated Dec. 3, 2019, 8 pages.
International Search Report in PCT/CN2019/102378 dated Nov. 6, 2019, 7 pages.
International Search Report in PCT/CN2019/102385 dated Nov. 18, 2019, 6 pages.
International Search Report in PCT/CN2019/102389 dated Nov. 28, 2019, 8 pages.
International Search Report in PCT/CN2019/102396 dated Nov. 27, 2019, 8 pages.
International Search Report in PCT/CN2019/102395 dated Nov. 27, 2019, 9 pages.
International Search Report in PCT/CN2019/102406 dated Nov. 26, 2019, 7 pages.
International Search Report In PCT/CN2019/102407 dated Nov. 8, 2019, 6 pages.
International Search Report in PCT/CN2019/102408 dated Nov. 6, 2019, 6 pages.
International Search Report in PCT/CN2019/102398 dated Oct. 31, 2019, 6 pages.
International Search Report in PCT/CN2019/102386 dated Nov. 25, 2019, 7 pages.
International Search Report in PCT/CN2019/102390 dated Nov. 22, 2019, 8 pages.
International Search Report in PCT/CN2019/102391 dated Nov. 22, 2019, 8 pages.
International Search Report in PCT/CN2014/094065 dated Mar. 17, 2015, 5 pages.
Written Opinion in PCT/CN2014/094065 dated Mar. 17, 2015, 10 pages.
The Extended European Search Report in European Application No. 14877111.6 dated Mar. 17, 2017, 6 pages.
The Communication Pursuant to Article 94(3) EPC in European Application No. 14877111.6 dated Apr. 23, 2018, 6 pages.
First Examination Report in Indian Application No. 201617026062 dated Nov. 13, 2020, 6 pages.
Notice of Reasons for Rejection in Japanese Application No. 2016-545828 dated Oct. 10, 2017, 6 pages.
Decision to Grant a Patent in Japanese Application No. 2016-545828 dated Jan. 16, 2018, 5 pages.
Decision of Patent Grant in Korean Application No. 10-2016-7017110 dated Jun. 14, 2018, 3 pages.
First Office Action in Chinese Application No. 201810975515.1 dated Apr. 13, 2023, 23 pages.

* cited by examiner

GLASSES

CROSS-REFERENCE TO RELATED APPLICATION

This application is a continuation of International Application No. PCT/CN2019/102395, filed on Aug. 24, 2019, which claims priority of Chinese Patent Application No. 201810975515.1 filed on Aug. 24, 2018, the contents of each of which are hereby incorporated by reference in its entirety.

TECHNICAL FIELD

The present disclosure relates to the field of glasses, and more specifically relates to glasses having a hinge component.

BACKGROUND

People often wear glasses in daily life, such as short-sighted glasses, far-sighted glasses, sunglasses, virtual reality (VR) glasses, massage glasses, etc. However, these glasses have a single function and cannot meet multiple requirements of people at the same time. For example, people often wear sunglasses when going out for sports or traveling. However, if they want to listen to music at the same time, they need to prepare additional earphones, which is not convenient to carry and store. Therefore, glasses with an earphone function bring great convenience to users.

SUMMARY

An embodiment of the present disclosure may provide glasses. The glasses may include a glasses frame and two speakers. The glasses frame may include a glasses rim and two glasses temples. The two glasses temples may be rotatably connected to the glasses rim, respectively. The two speakers may be connected to the two glasses temples via hinge components of the two glasses temples, respectively. The hinge components may be rotatable to change a position of each of the speakers relative to one of the glasses temples. The two speakers may include an earphone core and an earphone housing. The earphone housing may include a housing panel facing a human body and a housing back opposite to the housing panel. At least one of the glasses temples may include a control circuit or a battery. The control circuit or the battery may drive the earphone core to vibrate to generate sound. A vibration of the earphone core may result in vibrations of the housing panel and the housing back. The vibration of the housing panel may have a first phase, and the vibration of the housing back may have a second phase, vibration frequencies of the housing panel and the housing back may be in a range of 2000 Hz to 3000 Hz, and an absolute value of a difference between the first phase and the second phase may be less than 60 degrees.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
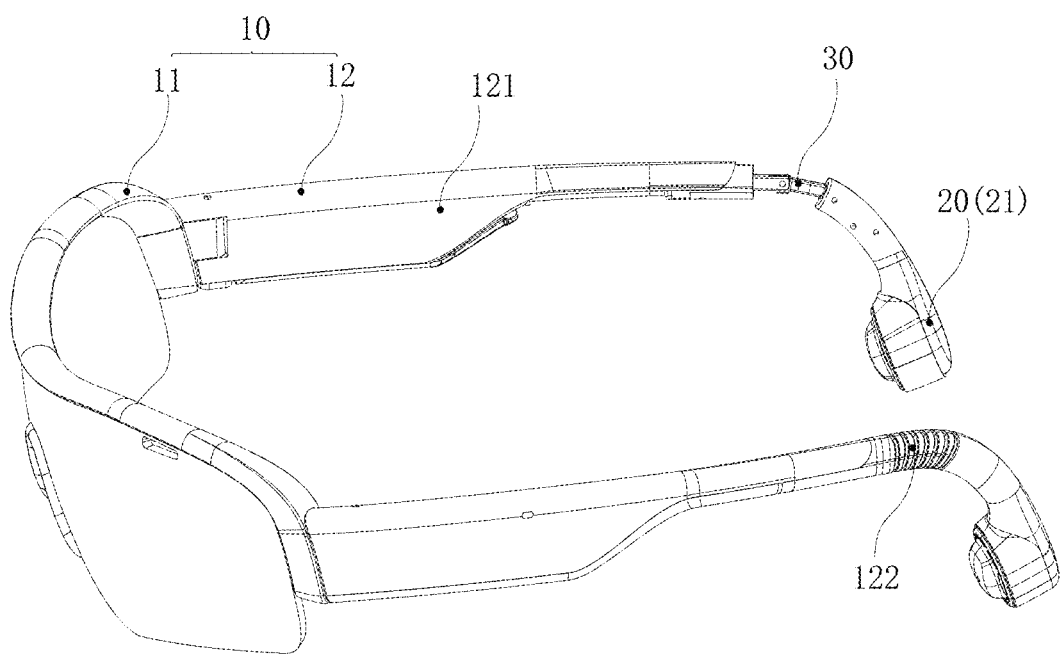
FIG. 1 is a schematic structural diagram illustrating glasses according to some embodiments of the present disclosure.

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, when describing the sound conduction related technology in the present disclosure, terms "player", "speaker component", or "speaker device" may be used. The terms are only forms of sound conduction application, for those skilled in the art, "player," "playing device," "speaker component", "speaker device", or "hearing aid" may also be replaced with other similar words. In fact, the various implementations in the present disclosure may be easily applied to hearing devices other than the speaker. For example, for those skilled in the art, after understanding the basic principles of glasses, it may be possible to make various modifications and changes in the form and details of the specific methods and operations of implementing the speaker without departing from the principles. In particular, an environmental sound collection and processing function may be added to the speaker to enable the speaker to implement the function of a hearing aid. For example, a microphone may collect environmental sounds of a user/wearer, process the sounds using an algorithm and transmit the processed sound (or generated electrical signal) to a speaker of glasses. That is, the speaker may be modified to include the function of collecting the environmental sounds, and after a signal processing, the sound may be transmitted to the user/wearer via the speaker, thereby implementing the function of the hearing aid. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Referring to FIG. 1, FIG. 1 is a schematic structural diagram illustrating glasses according to an embodiment of the present disclosure. In the embodiment, the glasses may include a glasses frame 10 and a function member 20.

In some embodiments, the glasses frame 10 in the present disclosure may include glasses frames of various glasses such as short-sighted glasses, far-sighted glasses, sunglasses, 3D glasses, etc., and be not limited herein.

The function member 20 may be connected to the glasses frame 10 so that the glasses may further have some other functional modules or components. For example, the function member 20 may include a speaker including a bone conduction speaker, an air conduction speaker, or the like. Of course, the function member 20 may also include other components, such as a positioning device, and be not limited herein.

In some embodiments, the glasses frame 10 may include a glasses rim 11 and two glasses temples 12. The glass temple 12 may include a main body 121 of the glass temple and a hinge component 122. The main body 121 may be rotatably connected to the glasses rim 11. A speaker 21 may be connected to the glass temple 12 via the hinge component 122.

Figure 2:
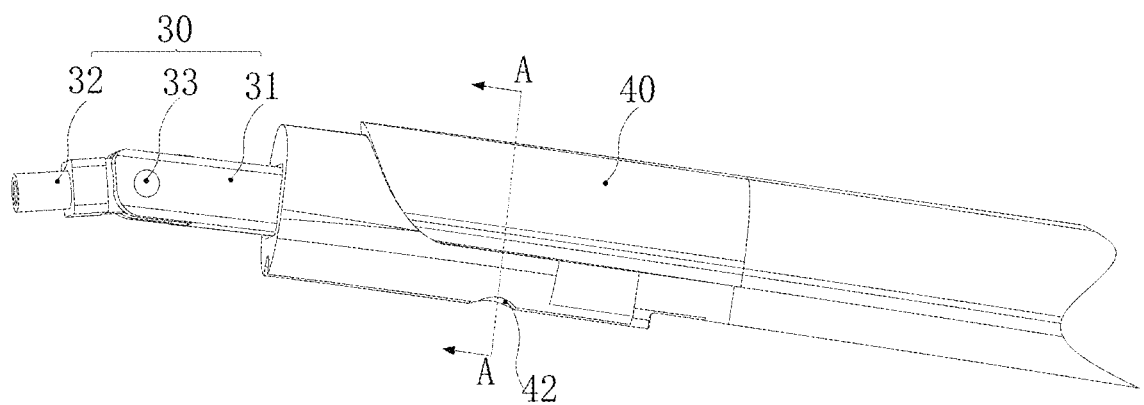
FIG. 2 is a schematic structural diagram illustrating a hinge component according to some embodiments of the present disclosure.
Figure 3:
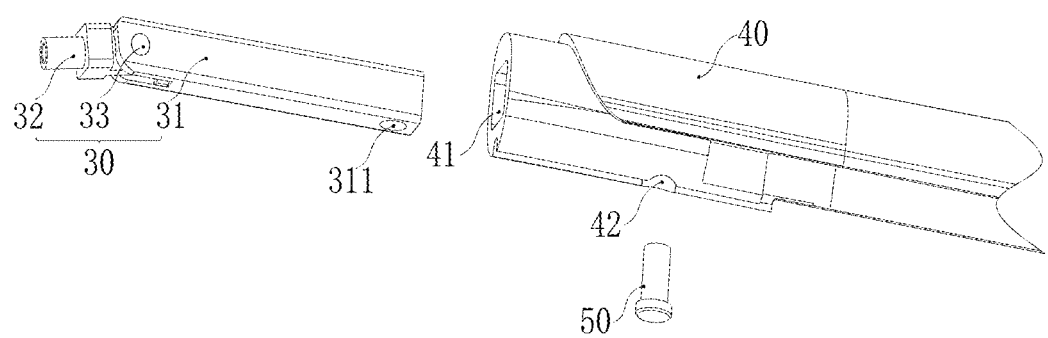
FIG. 3 is a schematic diagram illustrating an explosion structure according to some embodiments of the present disclosure.

FIG. 2 is a schematic structural diagram illustrating a hinge component according to an embodiment of the present disclosure. FIG. 3 is an exploded structural schematic diagram illustrating a hinge component according to an embodiment of the present disclosure. In some embodiments, the hinge component 122 of the present disclosure may be used in glasses in some embodiment of the present disclosure.

In the present disclosure, the hinge component 122 may include a hinge 30. The hinge 30 may be a structure used to connect two solids and allow a relative rotation between the two solids.

Specifically, when the hinge component 122 in the embodiment is used in the embodiment of the glasses described above, the hinge component 122 may be disposed at an end of the main body 121 of the glass temple away from the glasses rim 11. The function member 20 may further be connected to the end of the main body 121 of the glass temple away from the glasses rim 11 via the hinge 30.

In some embodiments, the hinge component 122 may also include a rod-shaped member 40 and a fixing member 50. In some embodiments, the hinge 30 may include a hinge mount 31 and a hinge arm 32. In some embodiments, the hinge arm 32 may be rotatably connected to the hinge mount 31 via a rotating shaft 33. It is easily understood that the hinge mount 31 and the hinge arm 32 may be respectively connected to two members that need to be rotatably connected. Therefore, the two members may be rotatably connected together via the rotating shaft 33 of the hinge 30.

In some embodiments, the hinge mount 31 of the hinge 30 may be connected to the rod-shaped member 40. In some embodiments, the rod-shaped member 40 may be a partial structure or an integral structure of one of the two members that are rotatably connected via the hinge 30. Alternatively, the rod-shaped member 40 may be a connection structure that connects one of the two members that need to be rotatably connected to the hinge 30. When the hinge component 122 in the embodiment is used for the glasses, the rod-shaped member 40 may be at least a portion of the main body 121 of the glass temple of the glasses. For example, the rod-shaped member 40 may be the entirety of the main body 121 of the glass temple. Alternatively, the rod-shaped member 40 may be a portion of an end of the main body 121 of the glass temple away from the glasses rim 11. The hinge 30 may be disposed at the end of the main body 121 of the glass temple away from the glasses rim 11 via the portion of the main body 121 of the glass temple.

Specifically, the rod-shaped member 40 may be provided with a hinge chamber 41 connected to an end surface of the rod-shaped member 40 along the length direction. A side wall of the rod-shaped member 40 may be provided with a first insertion hole 42 communicating with the hinge chamber 41. The end of the hinge mount 31 away from the hinge arm 32 may be inserted into the hinge chamber 41 from the end surface of the rod-shaped member 40, and fixed in the hinge chamber 41 via a fixing member 50 inserted in the first insertion hole 42.

In the embodiment, the hinge chamber 41 may communicate with the end surface of the main body 121 of the glass temple away from the end of the glasses rim 11. Therefore, the hinge mount 31 is inserted into the hinge chamber 41 and the hinge 30 is connected to the main body 121 of the glass temple.

In some embodiments, the hinge chamber 41 may be formed during a molding process of the rod-shaped member 40. For example, the material of the rod-shaped member 40 may be rubber or plastic. At this time, the hinge chamber 41 may be formed by injection molding. The shape of the hinge chamber 41 may match the hinge mount 31 so that the hinge mount 31 may be accommodated inside the hinge chamber 41. In the embodiment, the main body 121 of the glass temple may have the shape of a long straight rod along the length direction. Correspondingly, the rod-shaped member 40 may be a straight rod along the length direction, and the hinge chamber 41 may be disposed inside the straight rod. Further, the hinge mount 31 may match the hinge chamber 41 to be accommodated inside the hinge chamber 41 to implement the installation of the hinge 30. Of course, in other embodiments, the rod-shaped member 40 may also have other shapes such as an arc-shaped rod.

In addition, the first insertion hole 42 may be formed during the molding process of the rod-shaped member 40, or may be further formed on a side wall of the rod-shaped member by a manner such as drilling after the molding process. Specifically, in the embodiment, the shape of the first insertion hole 42 may be a circle, and may be other shapes such as a square or a triangle in other embodiments. The shape of the fixing member 50 may match the first insertion hole 42 so that the fixing member 50 may be inserted into the first insertion hole 42 from the outside of the rod 40. Further, the hinge mount 31 may be fixed inside the hinge chamber 41 by abutting the side wall of the hinge mount 31 or further penetrating the outer wall of the hinge mount 31 in a plugging manner. Specifically, a matching thread may be provided on the inner wall of the first insertion hole 42 and the outer wall of the fixing member 50. Therefore, the fixing member 50 may be connected to the first insertion hole 42 in a screwing manner to further fix the hinge mount 31 inside the hinge chamber 41. Of course, other manners may also be used, such as connecting the first insertion hole 42 and the fixing member 50 in an interference fit manner.

Further, the hinge arm 32 may also be connected to other components. Therefore, after the other components are connected to the hinge arm 32, the other components and the rod-shaped member 40 or other components connected to the rod-shaped member 40 may further rotate around the rotating shaft 33 by mounting the hinge mount 31 inside the hinge chamber 41. For example, when the hinge component 122 is used in the glasses, the function member 20 (e.g., the speaker 21) may be connected to the end of the hinge arm 32 away from the hinge mount 31. Therefore, the function member 20 may be connected to the end of the main body 121 of the glass temple away from the glasses rim 11 via the hinge 30.

In the above manner, the rod-shaped member 40 may be provided with the hinge chamber 41 communicating with the end surface of the rod-shaped member 40. The hinge 30 may be accommodated inside the hinge chamber 41 via the hinge mount 31. The fixing member 50 may further penetrate the side wall of the rod 40 via the first insertion hole 42. Therefore, the hinge mount 31 accommodated inside the hinge chamber 41 may be fixed inside the hinge chamber 41. Therefore, the hinge 30 may be detached relative to the rod-shaped member 40 to facilitate the replacement of the hinge 30 or the rod-shaped member 40. When applied to the glasses in the embodiment of the present disclosure described above, the hinge 30 and the function member 20 may be detachable relative to the main body 121 of the glass temple. Therefore, it may be easy to replace when the function member 20, the glasses rim 11, or the main body 121 of the glass temple is damaged.

Further referring to FIG. 3, in one embodiment, the hinge mount 31 may be provided with a second insertion hole 311 corresponding to the first insertion hole 42. The fixing member 50 may be further inserted into the second insertion hole 311.

Specifically, the shape of the second insertion hole 311 may match the fixing member 50, so that the fixing member 50 may be further inserted into the second insertion hole 311 to fix the hinge mount 31 after passing through the first insertion hole 42. Therefore, the shaking of the hinge mount 31 inside the hinge chamber 41 may be reduced and the hinge 30 may be fixed more firmly. Specifically, similar to the connection manner of the first insertion hole 42 and the fixing member 50, the inner wall of the second insertion hole 311 may be provided with a matching thread corresponding to the outer wall of the fixing member 50. Therefore, the fixing member 50 and the hinge mount 31 may be screwed together. Alternatively, the inner wall of the second insertion hole 311 and the outer wall of a corresponding contact position of the fixing member 50 may be smooth surfaces. Therefore, the fixing member 50 and the second insertion hole 311 may be in an interference fit, and be not specifically limited herein.

Further, the second insertion hole 311 may penetrate both sides of the hinge mount 31, so that the fixing member 50 may further penetrate the entire hinge mount 31. The hinge mount 31 may be more firmly fixed inside the hinge chamber 41.

Figure 4:
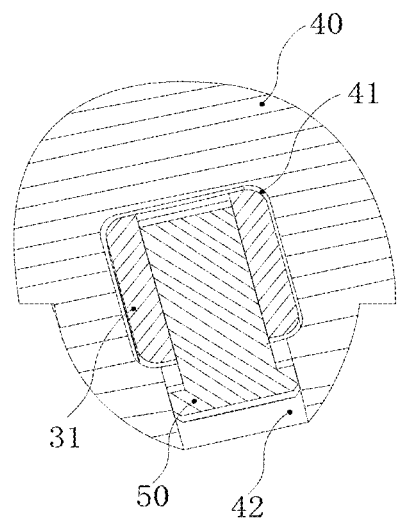
FIG. 4 illustrates a sectional view of the hinge component in FIG. 2 along an A-A axis according to some embodiments of the present disclosure.

Further referring to FIG. 4, FIG. 4 is a sectional view of the hinge component 122 in FIG. 2 along an A-A axis according to some embodiments of the present disclosure. In the embodiment, a cross-sectional shape of the hinge mount 31 may match a cross-sectional shape of the hinge chamber 41 in a section perpendicular to the longitudinal direction of the rod-shaped member 40. Therefore, the hinge mount 31 and the rod-shaped member 40 may form a tight fit after the insertion.

In some embodiments, the cross-sectional shape of the hinge mount 31 and the cross-sectional shape of the hinge chamber 41 may include any shape in the section shown in FIG. 4, as long as the hinge mount 31 is inserted into the hinge chamber 41 from an end surface of the rod-shaped member 40 away from the hinge arm 32. Further, the first insertion hole 42 may be disposed on a side wall of the hinge chamber 41, and pass through the side wall of the hinge chamber 41 and communicate with the hinge chamber 41.

In an application scenario, the cross-sectional shape of the hinge mount 31 and the cross-sectional shape of the hinge chamber 41 may have a rectangular shape. The first insertion hole 42 may be perpendicular to one side of the rectangle.

Specifically, in the application scenario, a corner angle of the outer wall of the hinge mount 31 or an angle of the inner wall of the hinge chamber 41 may be further in a fillet set to make contact between the hinge mount 31 and the hinge chamber 41 smoother. Therefore, the hinge mount 31 may be smoothly inserted into the hinge chamber 41.

It should be further pointed out that an amount of gas may be stored in the hinge chamber 41 before the hinge 30 is assembled. Therefore, if the hinge chamber 41 is a chamber with an open at only one end, the assembly of the hinge mount 31 may not be facilitated due to the difficulty in exhausting the gas inside the hinge chamber 41 during the assembly process. In the embodiment, the first insertion hole 42 may penetrate the side wall of the hinge chamber 41 and communicate with the hinge chamber 41 which may assist in exhausting the inner gas from the first insertion hole 42 through the hinge chamber 41 during the assembly, thereby facilitating the normal assembly of the hinge 30.

Figure 5:
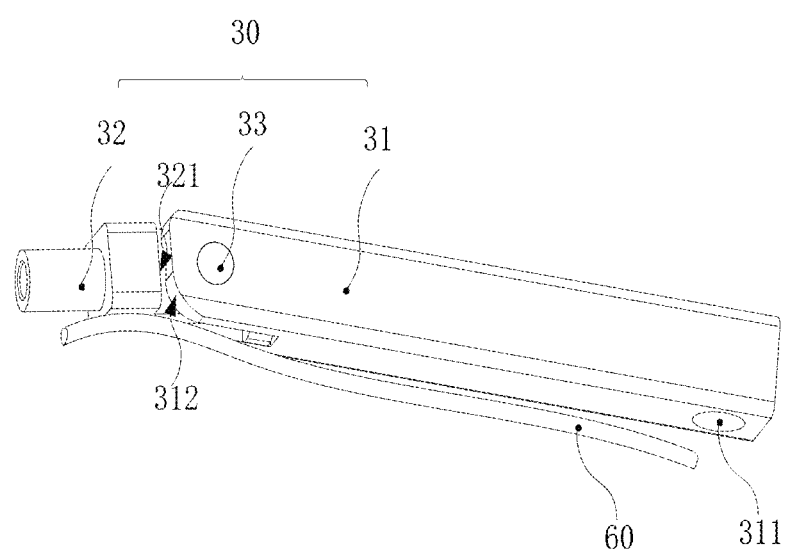
FIG. 5 is a schematic structural diagram illustrating a hinge component according to some embodiments of the present disclosure.
Figure 6:
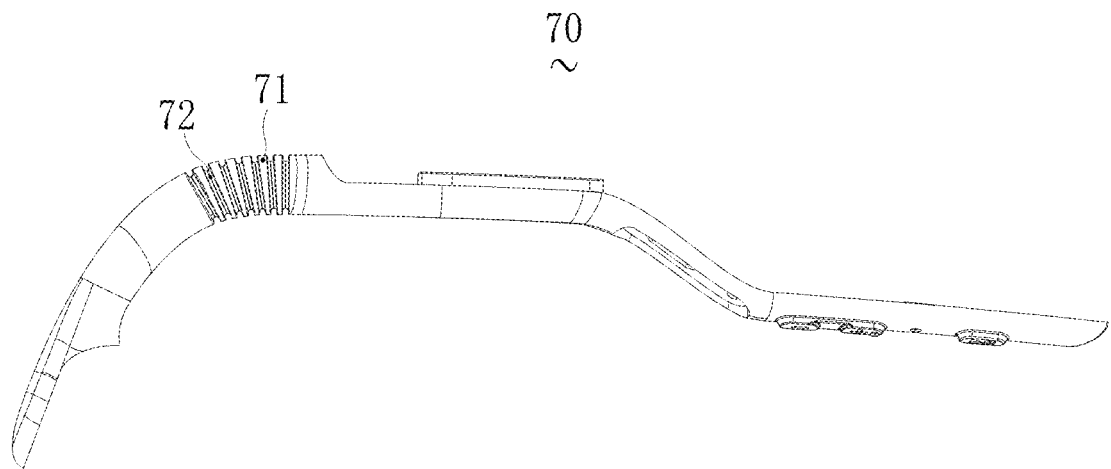
FIG. 6 is a diagram illustrating an original state of a protective sleeve according to some embodiments of the present disclosure.

Further referring to FIG. 5, FIG. 5 is a schematic structural diagram illustrating a hinge component according to an embodiment of the present disclosure. In the embodiment of the present disclosure, the hinge component 122 may further include a connection wire 60 disposed outside the hinge 30.

In some embodiments, the connection wire 60 may be a connection wire 60 having an electrical connection function and/or a mechanical connection function. When applied to the glasses in the embodiment of the present disclosure described above, the hinge component 122 may be used to connect the function member 20 to the end of the main body 121 of the glass temple away from the glasses rim 11. A control circuit and the like related to the function member 20 may be disposed on the main body 121 of the glass temple. At this time, the connection wire 60 may be required to electrically connect the function member 20 to the control circuit and the like of the main body 121 of the glass temple. Specifically, the connection wire 60 may be located at one side of the hinge mount 31 and the hinge arm 32, and disposed in the same accommodation space with the hinge 30.

Further, the hinge mount 31 may include a first end surface 312. The hinge arm 32 may have a second end surface 321 disposed opposite the first end surface 312. It is easily understood that there is a gap between the first end surface 312 and the second end surface 321. Therefore, the hinge mount 31 and the hinge arm 32 may be relatively rotated around the rotating shaft 33. In the embodiment, during the relative rotation of the hinge arm 32 and the hinge mount 31, relative positions between the first end surface 312 and the second end surface 321 may also change. Therefore, the gap between thereof may become larger or smaller.

In the embodiment, the gap between the first end surface 312 and the second end surface 321 may always be kept larger than or less than the diameter of the connection wire 60. Therefore, the connection wire 60 located outside the hinge 30 may not be inserted into the gap between the first end surface 312 and the second end surface 321 during the relative rotation of the hinge mount 31 and the hinge arm 32, thereby reducing the damage to the connection wire 60 by the hinge. Specifically, during the relative rotation of the hinge arm 32 and the hinge mount 31, the ratio of the gap between the first end surface 312 and the second end surface 321 to the diameter of the connection wire 60 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 7:
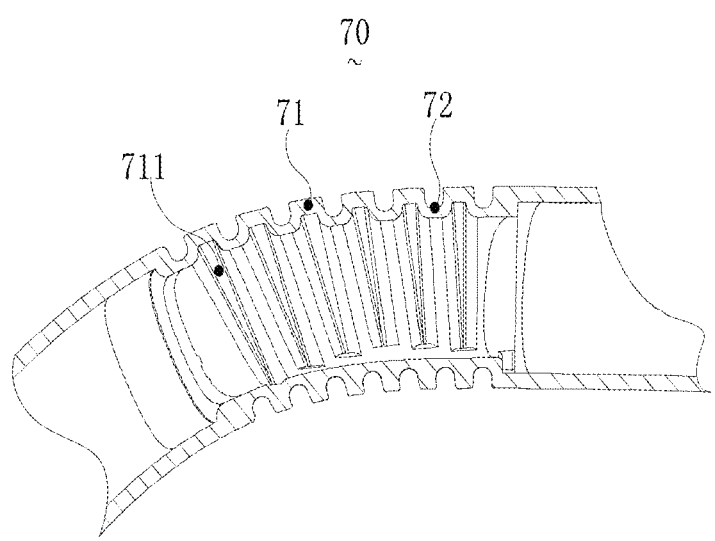
FIG. 7 illustrates a partial sectional view of an original state of a protective sleeve of a hinge component according to some embodiments of the present disclosure.
Figure 8:
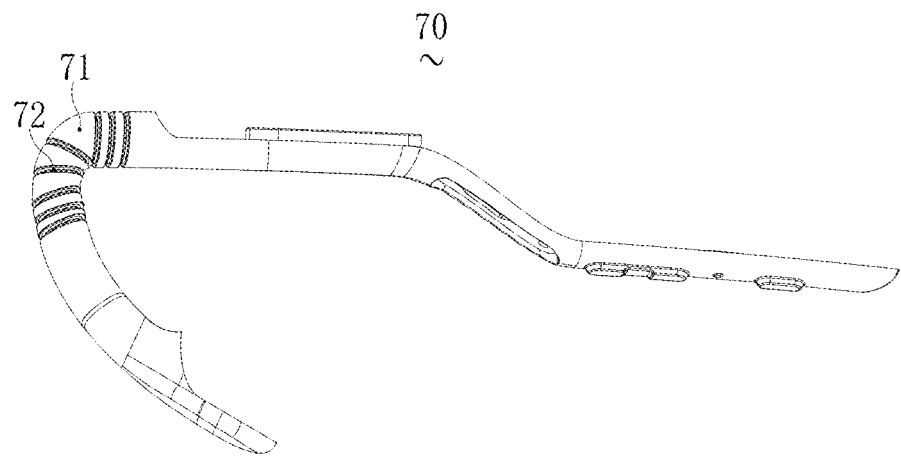
FIG. 8 is a diagram illustrating a bent state of a protective sleeve of a hinge component according to some embodiments of the present disclosure.
Figure 9:
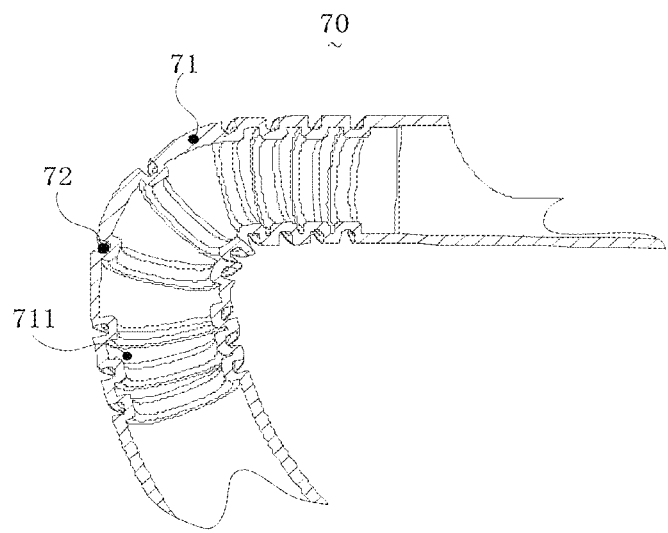
FIG. 9 illustrates a partial sectional view of a bent state of a hinge component protection sleeve according to some embodiments of the present disclosure.

Further referring to FIG. 2, and FIG. 6 to FIG. 9, FIG. 6 is a diagram illustrating an original state of a protective sleeve of a hinge component according to one embodiment of the present disclosure. FIG. 7 illustrates a partial sectional view of an original state of a protective sleeve of a hinge component according to an embodiment of the present disclosure. FIG. 8 is a diagram illustrating a bent state of a protective sleeve of a hinge component according to an embodiment of the present disclosure. FIG. 9 illustrates a partial sectional view of a bent state of a protective sleeve of a hinge component according to one embodiment of the present disclosure. In the embodiment, the hinge component 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 31 and the hinge arm 32. The protective sleeve 70 may be made of a soft material, such as soft silicone, rubber, etc.

The outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

The annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 31 and the hinge arm 32 of the hinge 30 are relatively rotated around the rotating shaft 33, the angle between the hinge mount 31 and the hinge arm 32 may change so that the protective sleeve 70 is bent as shown in FIGS. 8 and 9. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30. In one application scenario, both sides of the protective sleeve 70 along the length direction and rotating around the rotating shaft may be stretched or compressed. In another application scenario, the hinge mount 31 and the hinge arm 32 of the hinge 30 may rotate around the rotating shaft 33 only within a range less than or equal to 180 degree. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In one embodiment, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 towards the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 31 and the hinge arm 32 may be less than 180 degree. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region towards the bent shape to the side of the inner region towards the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region towards the bent shape to the side of the inner region towards the bent shape, so that the width may be more uniform, which may improve the stability of the protective sleeve 70.

In one embodiment, the annular ridge portion 71 may be disposed with a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 towards the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71. Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side towards the inner region of the bent shape may not be disposed with the groove 711 when the protective sleeve 70 is in the bent state. In an embodiment, the width of the groove 71 along the length of the protective sleeve 70 may gradually decrease from the side of the outer region towards the bent shape to the side of the inner region towards the bent shape. Therefore, no groove 711 may be disposed on the inner side wall of the protective sleeve 70 corresponding to the annular ridge portion 71 towards the inner region side of the bent shape.

Specifically, when the hinge component 122 in the embodiment is applied to the glasses in the embodiment of the present disclosure described above, the protective sleeve 70 may be disposed on the main bodies 121 of the glasses temples at both sides in the length direction of the protective sleeve 70, respectively, and connected to the function member 20. In an application scenario, the protective sleeve 70 may also be integrally formed as other structures of the glasses, such as protective covers of some components, so that the glasses may be more sealed and integrated.

It should be noted that the hinge component 122 in the embodiment of the present disclosure may not only be used in the glasses in the embodiment of the present disclosure, but also be used in other devices. Moreover, the hinge component 122 may also include other components related to the hinge 30 other than the rod-shaped member 40, the fixing member 50, the connection wire 60, the protective sleeve 70, etc. to achieve corresponding functions.

Figure 10:
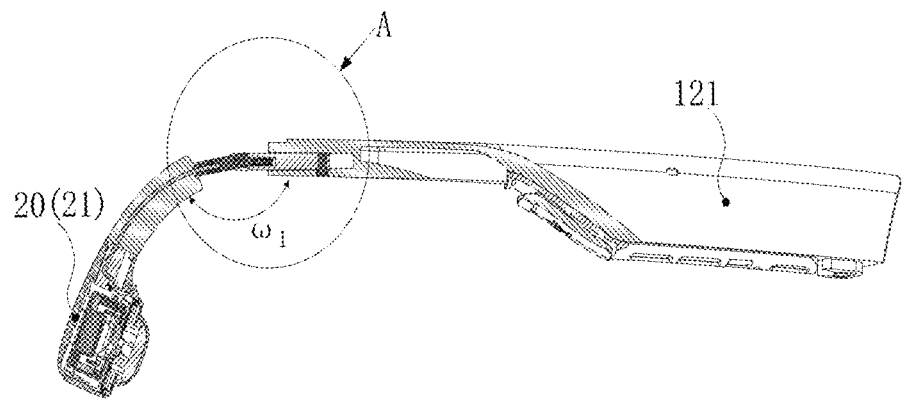
FIG. 10 illustrates a partial sectional view of glasses according to some embodiments of the present disclosure.
Figure 11:
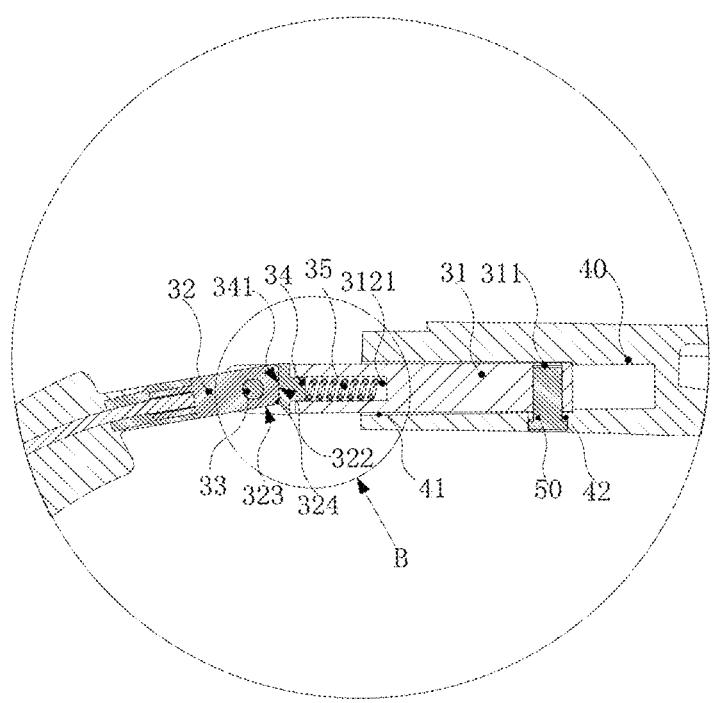
FIG. 11 illustrates an enlarged view of part A in FIG. 10 according to some embodiments of the present disclosure.
Figure 12:
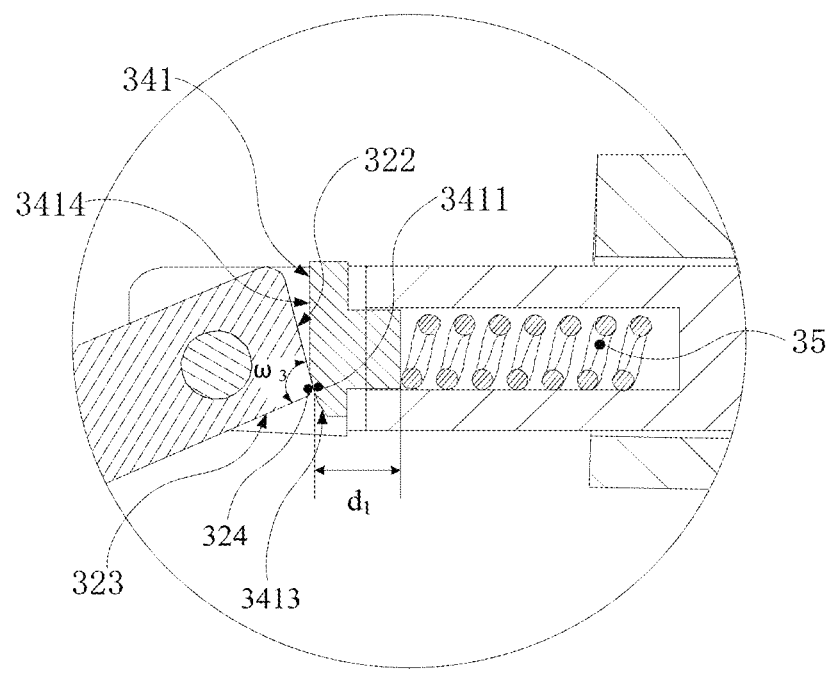
FIG. 12 illustrates an enlarged view of part B in FIG. 11 according to some embodiments of the present disclosure.
Figure 13:
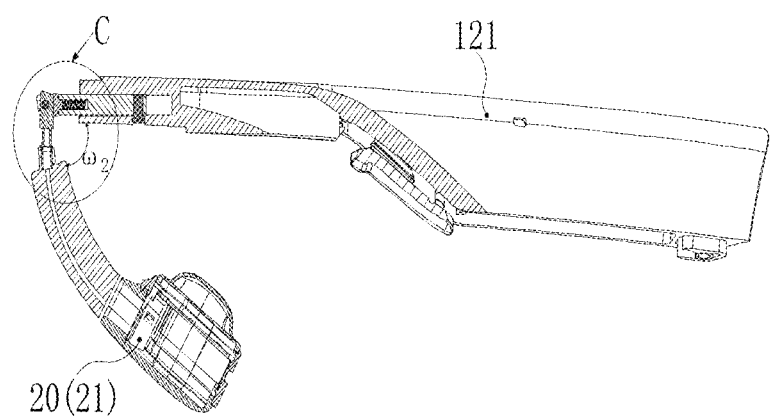
FIG. 13 illustrates a partial sectional view of glasses according to some embodiments of the present disclosure.
Figure 14:
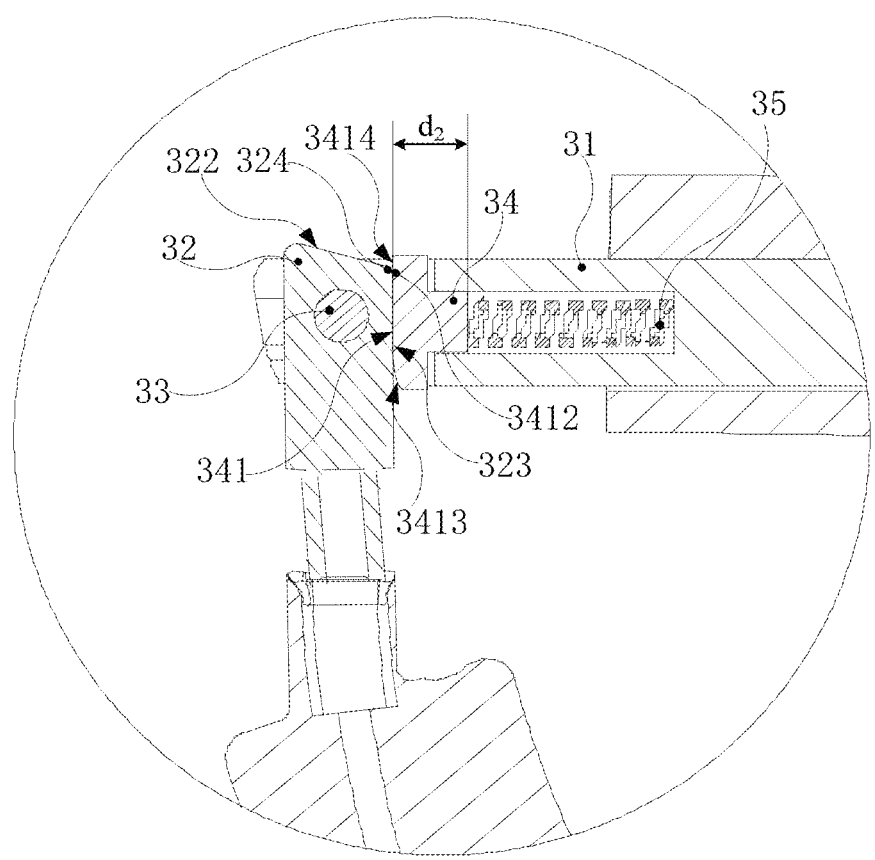
FIG. 14 illustrates an enlarged view of part C in FIG. 13 according to some embodiments of the present disclosure.

Specifically, referring to FIG. 10 to FIG. 14 together, FIG. 10 illustrates a partial sectional view of a hinge according to an embodiment of the present disclosure. FIG. 11 illustrates an enlarged view of part A in FIG. 10 according to some embodiments of the present disclosure. FIG. 12 illustrates an enlarged view of part B in FIG. 11 according to some embodiments of the present disclosure. Specifically, FIG. 12 shows an enlarged view of part B in FIG. 11 when the abutting between a first support surface and a third support surface is changed to the abutting between a second support surface and the third support surface. Therefore, a connection between the first support surface and the second support surface initially touches the third support surface. FIG. 13 illustrates a partial sectional view of a hinge according to an embodiment of the present disclosure. FIG. 14 illustrates an enlarged view of part C in FIG. 13 according to some embodiments of the present disclosure. It should be noted that the hinge 30 in the embodiment of the present disclosure may be used in the glasses in the embodiment of the present disclosure. The hinge 30 may be used in the hinge component 122 in the embodiments of the present disclosure, or used in other devices, and be not specifically limited herein.

In the embodiment, the hinge arm 32 of the hinge 30 may have a first support surface 322 and a second support surface 323 connected to each other.

The hinge 30 may also include a support member 34 and an elastic member 35. The support member 34 may be flexibly disposed on the hinge mount 31 and have a third support surface 341. The elastic member 35 may be used to elastically offset the support member 34 toward the hinge arm 32, so that the third support surface 341 may elastically abut on the first support surface 322 and the second support surface 323, respectively.

In some embodiments, when the hinge arm 32 is rotated relative to the hinge mount 31 under an external force, a connection 324 of the first support surface 322 and the second support surface 323 may drive the support member 34 against the elastic offset of the elastic member 35 to move in the opposite direction. Therefore, the third support surface 341 may be switched from elastically abutting on one of the first support surface 322 and the second support surface 323 to elastically abutting on the other of the first support surface 322 and the second support surface 323.

In an application scenario, the support member 34 may be connected to an end of the elastic member 35 towards the hinge arm 32. The third support surface 341 may face the side toward the hinge arm 32. In the process that the hinge arm 32 is rotated relative to the hinge mount 31 around the rotating shaft 33 under the external force, the third support surface 341 may be pushed so that the support member 34 may compress the elastic member 35. Further, the elastic offset may occur under the action of the elastic member 35. Of course, the elastic member 35 may be disconnected to the support member 34, and only abut on one side of the support member 34 as long as the support member 34 implements the elastic offset.

In some embodiments, the first support surface 322 and the second support surface 323 may be two side surfaces adjacent to the hinge arm 32 and at least partially parallel to the central axis of the rotating shaft 33, or a portion of the two side surfaces. When the hinge arm 32 rotates relative to the hinge mount 31, the first support surface 322 and the second support surface 323 may rotate with the hinge arm 32 around the rotating shaft 33. Therefore, different side surfaces of the hinge arm 32 may face the hinge mount 31. Thus, the hinge arm 32 may have different positions relative to the hinge mount 31.

In addition, the elastic member 35 may be a member that may provide an elastic force and be compressed in an elastic direction to provide a compression space. For example, the elastic member 35 may include a spring. One end of the spring may abut on the support member 34. When the third support surface 341 of support member 34 is pushed toward the elastic member 35, the elastic member 35 may be against the support member 34 and be compressed to provide a space in a direction that the third support surface 341 of the support member 34 faces. Therefore, when a relative position of the rotating shaft 33 is unchanged, there may be still enough space for different sides of the hinge arm 32 to rotate between the rotating shaft 33 and the third support surface 341.

Specifically, when the hinge arm 32 rotates relative to the hinge mount 31, the relative position of the rotating shaft 33 may be unchanged. A contact position of the hinge arm 32 and the third support surface 341 of the hinge mount 31 may change. Since distances between different positions of the hinge arm 32 and the rotating shaft 33 are different, the required space between the rotating shaft 33 and the contact position of the hinge arm 32 and the third support surface 341 may be different when different positions of the hinge arm 32 (e.g., different positions of the first support surface 322 and the second support surface 323) contact the third support surface 341. Due to the limitation of the elastic force and the space, the space provided by the compression of the elastic member 35 may be limited. Therefore, during the rotation of the hinge arm 32 relative to the hinge mount 31, if a distance between a position of the hinge arm 32 and the rotating shaft 33 is too large in a section perpendicular to the central axis of the rotating shaft 33, the position may be locked at another position of the third support surface during the rotation process, so that the hinge arm 32 may not continue to rotate. Therefore, the hinge arm 32 and the hinge mount 31 only rotates relatively within a range. In an application scenario, during the relative rotation between the hinge arm 32 and the hinge mount 31 around the rotating shaft 33, only the first support surface 322, the second support surface 323, and a region corresponding to the connection 324 between the first support surface 322 and the second support surface 323 may abut on the third support surface 341.

Further, in the embodiment, the first support surface 322 and the second support surface 323 may both be planes. A distance from the rotating shaft 33 to the connection 324 of the two support surfaces may be greater than a distance from the rotating shaft 33 to the first support surface 322 and a distance to the second support surface 323. The hinge 30 may have two relatively stable states that the third support surface 341 abuts on the first support surface 322 and the third support surface 341 abuts on the second support surface 323.

Of course, in the embodiment, the first support surface 322 and the second support surface 323 may also be curved surfaces with a radian or even include different sub-support surfaces, as long as a positional relationship between the hinge arm 32 and the hinge mount 31 may have at least two corresponding relatively stable states, and be not specifically limited herein. In addition, the hinge arm 32 may be disposed with more support surfaces. The hinge arm 32 and the hinge mount 31 may have various relative positional relationships by the different support surfaces elastically abutting on the third support surface 341 when the hinge arm 32 rotates relative to the hinge mount 31 around the rotating shaft 33 under an external force, and be not specifically limited herein.

Specifically, as shown in FIG. 11 and FIG. 12, an original state that the first support surface 322 abuts on the third support surface 341 of the support member 34 may be taken as an example. At this time, the elastic member 35 may have an elastic compression deformation, or be in an original natural state, and be not limited herein. When the hinge arm 32 rotates relative to the hinge mount 31 around the rotating shaft 33 under an external force of the hinge 30. Therefore, the second support surface 323 gradually approaches the third support surface 341, the connection 324 between the first support surface 322 and the second support surface 323 may touch the third support surface 341. Since the distance from the connection 324 to the rotating shaft 33 may be greater than the distance from the first support surface 322 to the rotating shaft 33, the connection 324 may abut on the support member 34 and push the support member 34 move toward the elastic member 35, thereby allowing the elastic member 35 against the pull to compress. When the hinge arm 32 is further stressed, the connection 324 may gradually approach a region between the rotating shaft 33 and the third support surface 341. In the process, the distance between the rotating shaft 33 and the third support surface 341 may gradually increase. It should be easily understood when a connection line between the connection 324 and the rotating shaft 33 is perpendicular to the third support surface 341, the distance from the rotating shaft 33 to the third support surface 341 may be equal to the distance from the rotating shaft 33 to the connection 324 in a section perpendicular to the central axis of the rotating shaft 33. At this time, the rotating shaft 33 may be farthest from the third support surface 341. At this time, if the force is continuously applied to the hinge 30, the distance from the rotating shaft 33 to the third support surface 341 may gradually become smaller, so that the required compression space of the elastic member 35 may be reduced. Then the elastic member 35 may gradually release the elastic force and recover until the connection 324 leaves the third support surface 341 and the second support surface 323 abuts on the third support surface 341, thereby switching from abutting the first support surface 322 on the third support surface 341 to abutting the second support surface 323 on the third support surface 341.

Similarly, the process (as shown in FIG. 13 and FIG. 14) for switching from an original state that the second support surface 323 abuts on the third support surface 341 of the support member 34 to a state that the first support surface 322 abuts on the third support surface 341 of the support member 34 may be similar to the above process.

It should be noted that the hinge 30 in the embodiment may be applied to the hinge component 122 of the glasses in the embodiment of the present disclosure. When the third support surface 341 is switched from elastically abutting on one of the first support surface 322 and the second support surface 323 to elastically abutting on the other of the first support surface 322 and the second support surface 323, the hinge component 122 may drive the speaker 21 to switch between a first relatively fixing position and a second relatively fixing position relative to the main body 121 of the glass temple. The hinge component 122 may fit on the back of an auricle of the user when the speaker 21 is in the first relatively fixing position. As used herein, the auricle may be a portion of an external ear and mainly composed of cartilage. In some embodiments, the speaker 21 may include a bone conduction speaker. By fitting the speaker to the back of the auricle, the cartilage of the auricle may be used to transmit bone conduction sound/vibration. The bone conduction speaker may be fitted to the back of the auricle, thereby improving the sound quality and reducing the impact on an ear canal during the sound transmission.

It should be noted that the distance from the rotating shaft 33 to the connection 324 may be greater than a vertical distance from the first support surface 322 and the second support surface 323. Therefore, in the process that the third support surface 341 is switched from elastically abutting on one of the first support surface 322 and the second support surface 323 to elastically abutting on the other of the first support surface 322 and the second support surface 323, the state of the hinge 30 may change abruptly.

The switch from elastically abutting between the first support surface 322 and the third support surface 341 to elastically abutting between the second support surface 323 and the third support surface 341 may be taken as an example. When a ratio between the maximum distance $h_1$ from the rotating shaft 33 to the connection 324 and the shortest distance $h_2$ from the rotating shaft 33 to the first support surface 322 is different, the change during the switching process may be different.

In one embodiment, the ratio between the maximum distance h1 from the rotating shaft 33 to the connection 324 and the shortest distance $h_2$ from the rotating shaft 33 to the first support surface 322 may be between 1.1 and 1.5 in the section perpendicular to the central axis of the rotating shaft 33.

Specifically, the maximum distance $h_1$ from the rotating shaft 33 to the connection 324 may be larger than the shortest distance $h_2$ of the rotating shaft 33 to the first support surface 322 by disposing the rotating shaft 33 away from the second support surface 323 and close to the side of the hinge arm 32 opposite to the second support surface 323, thereby satisfying the ratio described above.

It should be noted that the change may become obvious when the ratio between $h_1$ and $h_2$ is too large. However, a large force may be needed to switch from elastically abutting between the first support surface 322 and the third support surface 341 to elastically abutting between the second support surface 323 and the third support surface 341, thereby causing inconvenience. If the ratio between $h_1$ and $h_2$ is too small, although it is easier to switch the state, the change may be small. For example, when the user pulls the hinge 30, there may be no obvious handle sense, causing inconvenience. In the embodiment, the ratio of $h_1$ to $h_2$ may be set between 1.1 and 1.5, and the hinge 30 may have a more obvious change when the third support surface 341 is switched from elastically abutting on the first support surface 322 to elastically abutting on the second support surface 323. Thus, during use, the user may have a relatively obvious handle sense of pulling the hinge 30. At the same time, the change may not be too abrupt to making it difficult for the user to switch the state of the hinge 30.

In an application scenario, the ratio of $h_1$ to $h_2$ may also be between 1.2 and 1.4. Specifically, the ratio of $h_1$ to $h_2$ may also be 1.1, 1.2, 1.3, 1.4, 1.5, etc., and be not specifically limited herein.

In addition, the positions of the first support surface 322 and the second support surface 323 set on the hinge arm 32 may affect the included angle between the hinge arm 32 and the hinge mount 31 when the third support surface 341 abuts on one of the first support surface 322 and the second support surface 323. Therefore, the positions of the first support surface 322 and the second support surface 323 on the hinge arm 32 may be set differently according to specific user requirements. In some embodiments, the included angle between the hinge arm 32 and the hinge mount 31 may be specifically shown in FIG. 9 and FIG. 12. ω1 may be the included angle between the hinge arm 32 and the hinge mount 31 when the third support surface 341 abuts on the first support surface 322. ω2 may be the included angle between the hinge arm 32 and the hinge mount 31 when the third support surface 341 abuts on the second support surface 323. In one embodiment, each of the hinge arm 32 and the hinge mount 31 may have a length. The hinge arm 32 may be disposed on one end side of the hinge mount 31 in the length direction. The first support surface 322 may be disposed at the end of the hinge arm 32 near the hinge mount 31 in the length direction. The second support surface 323 may be disposed at one end in the width direction of the hinge arm 32 and parallel to the central axis of the rotating shaft 33. At this time, when the third support surface 341 elastically abuts on the first support surface 322, the included angle between the hinge arm 32 and the hinge mount 31 may be the largest. When the third support surface 341 elastically abuts on the second support surface 323, the included angle between the hinge arm 32 and the hinge mount 31 may be the smallest. Therefore, the included angle between the hinge mount 31 and the hinge arm 32 may be changed from ω1 to ω2 and become smaller when the third support surface 341 is switched from elastically abutting on the first support surface 322 to elastically abutting on the second support surface 323.

It should to be further noted if the direction of the force applied to the hinge arm 32 is the same as the direction of the gravity of the hinge arm 32 when the third support surface 341 is switched from elastically abutting on the first support surface 322 to elastically abutting on the second support surface 323, the switching in this state may make the included angle between the hinge mount 31 and the hinge arm 32 smaller. The setting of the ratio between the $h_1$ and $h_2$ in the embodiment may also make the hinge arm 32 not or hardly reduce the angle between the hinge arm 32 and the hinge mount 31 spontaneously due to the own gravity when the third support surface 341 elastically abut on the first support surface 322.

In an embodiment of a hinge in the present disclosure, referring to FIG. 12, the included angle $ω_3$ between the first support surface 322 and the second support surface 323 may be an obtuse angle in a section perpendicular to the central axis of the rotating shaft 33.

In some embodiments, when the hinge 30 switches from the state of elastically abutting between the first support surface 322 and the third support surface 341 to the state of elastically abutting between the second support surface 323 and the third support surface 341, the smaller the included angle $ω_3$ between the first support surface 322 and the second support surface 323, the larger the relative rotation angle between the hinge mount 31 and the hinge arm 32 may be when the state is switched. That is, when the hinge mount 31 is fixed, the user may need to move the hinge arm 32 to a larger angle to switch the state of the hinge 30, so that the user may be laborious and it may bring inconvenience to the user.

Since the hinge arm 32 has a length, and the first support surface 322 is disposed at one end in the length direction of the hinge arm 32, the second support surface 323 may be disposed adjacent to the first support surface 322 in the width direction of the hinge arm 32. Normally, the first support surface 322 and the second support surface 323 may be arranged vertically. At this time, when the hinge 30 is switched between the two states, the hinge arm 32 and the hinge mount 31 may need to be moved relative to each other by 90 degree.

In the embodiment, in the section perpendicular to the central axis of the rotating shaft 33, the included angle $ω_3$ between the first support surface 322 and the second support surface 323 may be an obtuse angle. Thus, the angle required for the relative movement of the hinge arm 32 and the hinge mount 31 may be less than 90 degree when the hinge 30 switches between the two states, which may facilitate the user.

Specifically, when the hinge 30 in the embodiment is used in the embodiment of the glasses in the present disclosure, the hinge 30 may be used to connect the main body 121 of the glass temple and the speaker 21. In some embodiments, the speaker 21 may be a bone conduction speaker. For example, when the hinge 30 is in a second state of elastically abutting between the second support surface 323 and the third support surface 341, the speaker 21 may be in the first relatively fixing position to fit the back of the auricle of the user. Therefore, when the user needs to use the function of the speaker 21 of the glasses, the user may only need to rotate the speaker 21 by an angle less than 90 degree to fit it to the back of the auricle of the user. In addition, when the hinge 30 is in a first state of elastically abutting between the first support surface 322 and the third support surface 341, the hinge arm 32 and the connected speaker 21 may form an angle. Therefore, the hinge arm 32 and the connected speaker 21 may be located behind an ear of the user and face the direction of the ear of the user when the user wears the glasses. Therefore, the glasses may be blocked and fixed, and prevented from falling off the head of the user.

It should be noted that the included angle $ω_3$ between the first support surface 322 and the second support surface 323 may be set according to actual requirements. If the included angle is too large, the included angle between the hinge arm 32 and the hinge mount 31 and the angle between the function member 20 connected to the end of the hinge arm 32 away from the hinge mount 31 and the hinge mount 31 may be smaller. Therefore, the hinge arm 32 and the function member 20 may be too close to the ears of the user to compress the ears when the user wears it, reducing the comfort of the user. If the included angle is too small, on the one hand, the required angle may be too large, which is inconvenient for the user when the user moves the speaker 21 to switch between the first relative position and the second relative position. On the other hand, the included angle between the main body 121 of the glass temple and the hinge 30 and the included angle between the main body 121 of the glass temple and the speaker 21 may be too small to play a role in blocking and fixing the glasses. Therefore, the glasses may be easily dropped from the front side of the head of the user when the user wears the glasses. Specifically, the included angle between the first support surface 322 and the second support surface 323 may be set according to the shape of the head of the user.

Specifically, in an application scenario, in the section perpendicular to the central axis of the rotating shaft 33, the included angle $\omega_3$ between the first support surface 322 and the second support surface 323 may be between 100 degree and 120 degree, and specifically be 100 degree, 110 degree, 120 degree, or the like. The setting of the angle may enable the user to wear the glasses, and the speaker 21 may not be too close to the ears of the user to cause discomfort to the ears of the user when the speaker 21 is in the first relatively fixing position. It may be unnecessary to rotate the hinge by an excessive angle upon switching between the two relative positions of the speaker 21, which is convenient for users.

In some embodiments, in the process that the third support surface 341 is switched from elastically abutting on one of the first support surface 322 and the second support surface 323 to elastically abutting on the other of the first support surface 322 and the second support surface 323, the connection 324 between the first support surface 322 and the second support surface 323 may abut on the third support surface 341, and drive the support member 34 against the elastic offset of the elastic member 35 to move in the opposite direction. Elastically abutting between the third support surface 341 and the first support surface 322 before the switching may be taken as an example. At the start of the switching, while the first support surface 322 gradually moves away from the third support surface 341, the connection 324 may gradually abut on the third support surface 341 and slide from one side of the third support surface 341 to another side of the third support surface 341 during the switching process. Finally, the second support surface 323 and the third support surface 341 may further turn to elastically abut. During the state switching process, the connection 324 may always abut on and interact with the third support surface 341. The shape of the connection 324 may have an effect on the state switching process. For example, if the first support surface 322 and the second support surface 323 are line-connected, the connection 324 may have a relatively sharp angle. Therefore, during the user pulls the hinge mount 31 and/or the hinge arm 32 to switch the state of the hinge 30, on the one hand, the buffer may be small and the switching may be abrupt upon switching from abutting between the connection 324 and the third support surface 341 to abutting between the connection 324 and the first support surface 322 and the second support surface 323. The user may feel poor when pulling the hinge 30. On the other hand, the connection 324 may be relatively sharp, which may cause wear to the third support surface 341 during repeated switching processes.

In one embodiment of the present disclosure, in a section perpendicular to the central axis of the rotating shaft 33, the connection 324 may have a shape of an arc. As a result, the connection between the first support surface 322 and the second support surface 323 may be a connection with an arc surface. During the state switching process of the hinge 30, the connection 324 abutting on the third support surface 341 may be relatively smooth, so that the user may have a better fell when pulling the hinge 30. The damage to the third support surface 341 may be reduced during repeated switching processes.

Specifically, in one embodiment, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the glasses in the embodiment described above, the circular arc shape of the curvature of the connection 324 may enable the user to have a better feel when the hinge 30 is pulled to drive the speaker to switch between the first relatively fixing position and the second relatively fixing position.

In one embodiment, the third support surface 341 may be set so that the external force required when the third support surface 341 is switched from elastically abutting on the first support surface 322 to elastically abutting on the second support surface 323 may be different from the external force required when the third support surface 341 is switched from elastically abutting on the second support surface 323 to elastically abutting on the first support surface 322.

It should be noted that, in a specific use scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the glasses, the state switching of the hinge 30 may drive the speaker 21 to switch between the first relatively fixing position and the second relatively fixing position relative to the main body 121 of the glass temple. Correspondingly, the two relatively fixing positions may correspond to two situations where the user uses the speaker 21 and where the user does not use the speaker 21. When the user wears the glasses, difficulty of applying forces to the back of the head to switch between the two states may be different. Therefore, the design of applying different external forces to correspondingly switching between different states may facilitate the usage of the user.

Specifically, in an embodiment, when the third support surface 341 is switched from elastically abutting on the first support surface 322 to elastically abutting on the second support surface 323, the speaker 21 may move from the second relatively fixing position to the first relatively fixing position so as to fit the back of the auricle of the user.

Further, in the embodiment, the third support surface 341 may be set such that the external force required when the third support surface 341 is switched from elastically abutting on the first support surface 322 to elastically abutting on the second support surface 323 may be less than the external force required when the third support surface 341 is switched from elastically abutting on the second support surface 323 to elastically abutting on the first support surface 322.

It should be noted when the speaker 21 is used, the third support surface 341 may need to be switched from elastically abutting on the first support surface 322 to elastically abutting on the second support surface 323 upon being applied to the glasses. When the speaker 21 is not used, the third support surface 341 may need to be switched from elastically abutting on the second support surface 323 to elastically abutting on the third support surface 341. According to the embodiment, the force required when the user uses the speaker 21 may be less than the force required when the speaker 21 is not used. Therefore, it may be convenient for the user to use the function of the speaker 21 of the glasses.

Specifically, referring to FIG. 12 and FIG. 14 together, in an application scenario, when the third support surface 341 is switched from elastically abutting on the first support surface 322 to elastically abutting on the second support surface 323, the connection 324 may initially contact a first position 3411 of the third support surface 341. When the third support surface 341 is switched from t elastically abutting on the second support surface 323 to elastically abutting on the first support surface 322, the connection 324 may initially contact a second position 3412 of the third support surface 341. In some embodiments, in a section perpendicular to the central axis of the rotating shaft 33, a distance d1 between the first position 3411 and a contact point of the elastic member 35 and the support member 34 along the direction of the elastic offset of the elastic member 35 may be less than a distance d2 between the second position 3412 and the contact point in the direction of the elastic offset.

It should be noted when the third support surface 341 elastically abuts on the first support surface 322, the connection 324 may be located near a position of one end of the third support surface 341. When the third support surface 341 elastically abuts on the second support surface 323, the connection 324 may be located near a position of another end of the third support surface 341. Therefore, the first position 3411 and the second position 3412 may be located near the two ends of the third support surface 341, respectively. That is, in the embodiment, a distance between the positions of the third support surface 341 of the support member 34 near the two ends may be different from a distance between the elastic member 35 and the contact point of the support member 34 in the direction of the elastic offset of the elastic member 35. The distance corresponding to the second position 3412 may be less than the distance corresponding to the first position 3411. At this time, when the third support surface 341 is switched from elastically abutting on the first support surface 322 to elastically abutting on the second support surface 323, the connection 324 may not immediately abut on the third support surface 341 and receive a reaction force of the elastic member 35, but gradually abut on the third support surface 341 and receive the reaction force of the elastic member 35 during the switching process. When the third support surface 341 is switched from elastically abutting on the first support surface 322 to elastically abutting on the second support surface 323, the connection 324 may initially abut on the third support surface 341 and receive the reaction force of elastic member 35, or at least receive the reaction force of elastic member 35 earlier than that the third support surface 341 is switched from elastically abutting on the second support surface 323 to elastically abutting on the first support surface 322. Therefore, in this case, the hinge 30 may need a smaller force to switch from elastically abutting on the first support surface 322 to elastically abutting on the second support surface 323. Therefore, the force required to move the speaker 21 may be small when the user uses the speaker 21, which is convenient for the user.

Further, the third support surface 341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 341, respectively.

In some embodiments, the second sub-support surface 3414 may be a plane. Specifically, when the first support surface 322 or the second support surface 323 elastically abuts on the third support surface 341, the second sub-support surface 3414 may be parallel to the first support surface 322 or the second support surface 323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degree, for example, no greater than 2 degree, 4 degree, 6 degree, 8 degree, 10 degree, etc. Specifically, the first sub-support surface 3413 may be disposed in a direction away from the hinge arm 32. Therefore, in the section perpendicular to the central axis of the rotating shaft 33, the distance between the first position 3411 and the elastic member 35 and the distance between the first position 3411 and the contact point of the elastic member 35 in the direction of the elastic offset of the elastic member 35 may be less than the distance between the second position 3412 and the contact point in the direction of the elastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 15:
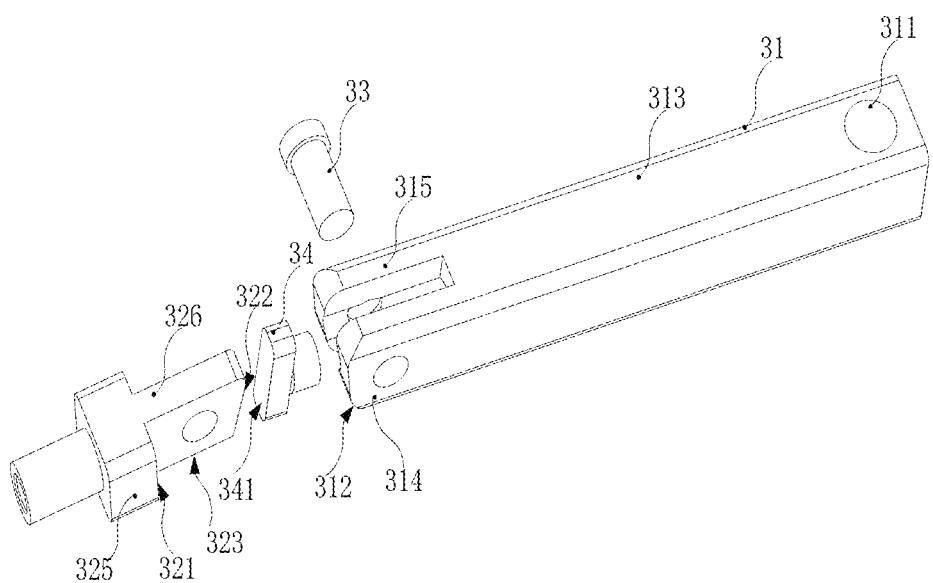
FIG. 15 is an exploded structural diagram illustrating glasses according to some embodiments of the present disclosure.

Referring to FIG. 15, FIG. 15 is an exploded structural diagram illustrating a hinge according to an embodiment of the present disclosure. In the embodiment, the hinge mount 31 may include a mount body 313, and a first lug 314 and a second lug 315 protruding from the mount body 313 and spaced from each other. The hinge arm 32 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 33. The first support surface 322 and the second support surface 323 may be disposed on the third lug 326. The support member 34 may be at least partially disposed in the interval region and located at the side of the third lug 326 towards the mount body 313. The mount body 313 may be disposed with an accommodation chamber 3121 communicating with the interval region. The elastic member 35 may be disposed inside the accommodation chamber 3121, and allow the support member 34 elastically offset towards the third lug 326.

Specifically, corresponding positions of the first lug 314, the second lug 315, and the third lug 326 may be respectively disposed with a first through-hole, a second through-hole, and a third through-hole located in a same axial direction. Inner diameters of the three through-holes may be no less than the outer diameter of the rotating shaft 33. Thus, when the rotating shaft 33 passes through a corresponding through-hole, the hinge mount 31 where the first lug 314 and the second lug 315 are located may be rotatably connected to the hinge arm 32 where the third lug 326 is located.

In some embodiments, the first support surface 322 and the second support surface 323 may be both disposed on the third lug 326 and parallel to the central axis of the rotating shaft 33. Therefore, the first support surface 322 and the second support surface 323 may enter the interval region between the first lug 314 and the second lug 315 when the hinge arm 32 rotates around the rotating shaft 33 relative to the hinge mount 31.

Further, the support member 34 may be located between the first lug 314 and the second lug 315 of the mount body 313. The third support surface 341 of the support member 34 may be disposed toward the third lug 326. In one application scenario, the elastic member 35 may be completely set inside the accommodation chamber 3121, and touch the support member 34 at the side towards the interval region between the first lug 314 and the second lug 315. When the elastic member 35 is in a natural state, a region of the support member 34 near the elastic member 35 may be at least partially located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 31. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 31. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge component 122 in the embodiment of the hinge component in present disclosure, the first end surface 312 of the hinge mount 31 may be an end surface of the first lug 314 and the second lug 315 toward the hinge arm 32. The third lug 326 facing a protrusion toward the arm body 325 may be located inside the interval region between the first lug 314 and the second lug 315. Therefore, the first end surface 312 of the first lug 314 and the second lug 315 may be disposed toward the arm body 325. In a section of the central axis direction of the rotating shaft 33, the arm body 325 may be further protruded from the third lug 326 to form a second end surface 321 of the first lug 314 and the second lug 315 toward the hinge mount 31.

In the embodiment, during the relative rotation of the hinge arm 32 and the hinge mount 31, a gap between the first end surface 312 of the first lug 314 and the second lug 315 and the second end surface 321 of the arm body 325 may always be larger or smaller than the diameter of the connection wire 60. Therefore, the connection wire 60 may not be sandwiched between the first lug 314 and the second lug 315 and the arm body 325 during the relative rotation of the hinge mount 31 and the hinge arm 32, thereby reducing the damage of the connection wire 60 by the hinge 30.

In an application scenario, the gap between the second end surface 321 of the first lug 314 and the second lug 315 and the first end surface 312 of the arm body 325 may always be kept much larger or smaller than the diameter of the connection wire 60 during the relative rotation of the hinge arm 32 and the hinge mount 31, thereby further reducing the damage of the connection wire 60 by the hinge 30.

It should be noted that, in the embodiment, the gap between the first end surface 312 and the second end surface 321 may be a gap with even size, thereby satisfying the above condition of being greater than or less than the diameter of the connection wire 60. Alternatively, in another embodiment, only gaps of positions at both end surfaces close to the connection wire 60 may be greater than or less than the diameter of the connection wire 60. Gaps of other positions at both end surfaces may not need to satisfy the condition.

Specifically, in an application scenario, in a section perpendicular to the central axis of the rotating shaft 33, at least one of an end surface of the first lug 314 and the second lug 315 towards the hinge arm 32 and an end surface of the arm body 325 towards the hinge mount 31 may be in a chamfer setting. Therefore, during the relative rotation of the hinge arm 32 and the hinge mount 31, the positions close to the connection wire 60 may always be kept larger than the diameter of the connection wire 60.

In some embodiments, the chamfer setting may be filleted, or directly chamfered.

In the application scenario, it may be only necessary to chamfer at least one of the end surface of the first lug 314 and the second lug 315 near the connection wire 60 towards the hinge arm 32 and the end surface of the arm body 325 towards the hinge mount 31. Therefore, during the relative rotation of the hinge arm 32 and the hinge mount 31, the connection wire 60 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

It should be noted that the above description of the hinge component of the glasses is only a specific example, and should not be regarded as the only feasible implementation solution. Obviously, for those skilled in the art, after understanding the basic principle of the hinge component of glasses, it may be possible to make various modifications and variations in the form and details of the specific method and operation of implementing the hinge component of the glasses without departing from these principles, but these modifications and variations are still within the scope described above. For example, the sectional shape of the hinge mount 31 and the hinge chamber 41 may be circular, oval, trapezoidal, or the like. All such variations may be within the protection scope of the present disclosure.

Figure 16:
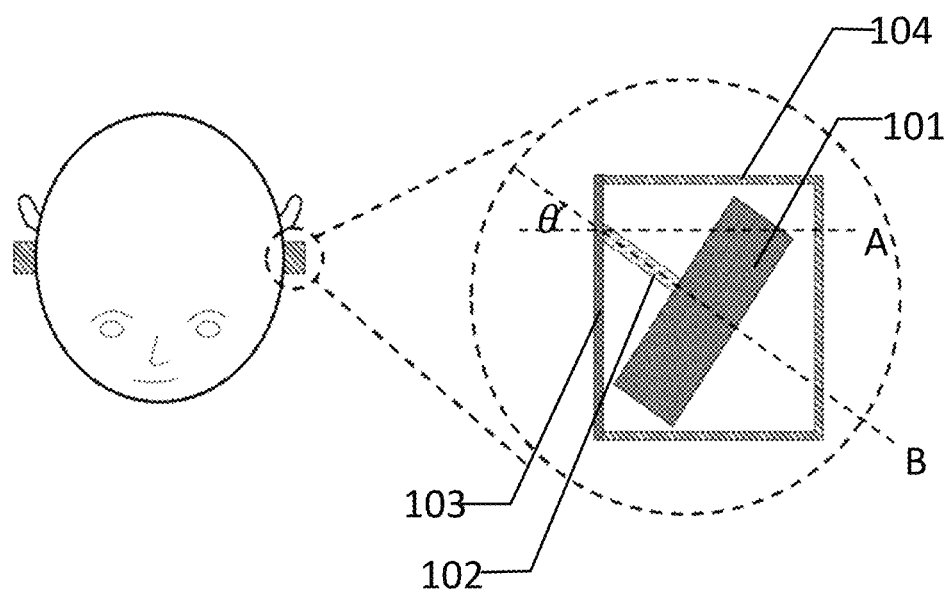
FIG. 16 is a schematic diagram of an application scenario and structure of glasses according to some embodiments of the present disclosure.

FIG. 16 is a schematic diagram of an application scenario and structure of a speaker according to some embodiments of the disclosure. Referring to FIG. 16 and FIG. 1, a mechanism diagram shown in FIG. 16 is equivalent to the speaker 21 in FIG. 1. The following only takes a bone conduction speaker as an example to illustrate the application scenario and structure of the speaker. It should be noted that an air conduction speaker can also replace the bone conduction speaker and achieve functions similar to the bone conduction speaker. In some embodiments, as shown in FIG. 16, the bone conduction speaker may include an earphone core 101, a transmission assembly 102, a panel 103 (the panel 103 may also be referred to as housing panel, which is a panel of a core housing facing the human body), a housing 104, etc. In some embodiments, the housing 104 may include a housing back and a housing side. The earphone core 101 may transmit vibration signals to the panel 103 and/or the housing 104 through the transmission assembly 102, so as to contact with human skin through the panel 103 or the housing 104, thereby transmitting sound to the human body. In some embodiments, the panel 103 and/or the housing 104 of the bone conduction speaker may be in contact with the human skin at a tragus, so as to transmit sound to the human body. In some embodiments, the panel 103 and/or the housing 104 may also be in contact with human skin on a back side of an auricle.

In some embodiments, a straight line B (or a vibration direction of a driving device) where a driving force generated by the earphone core 101 is located may have an included angle θ with a normal line A of the panel 103. In other words, the straight line B and the straight line A may not be parallel.

The panel has a region in contact with or abutting on the user's body (e.g., human skin). It should be understood that when the panel is covered with other materials (e.g., soft materials such as silicone, etc.) to enhance wearing comfort of the user, a relationship between the panel and the user's body may not direct contact, but be abutting on each other. In some embodiments, after the bone conduction speaker is worn on the user's body, all regions of the panel may be in contact with or abutting on the user's body. In some embodiments, after the bone conduction speaker is worn on the user's body, part region of the panel may be in contact with or abutting on the user's body. In some embodiments, the region of the panel used to contact with or abut on the user's body may occupy more than 50% of an area of the entire panel. More preferably, the region may occupy more than 60% of the area of the entire panel. Generally speaking, the region of the panel that is in contact with or abutting on the user's body may be a flat surface or a curved surface.

In some embodiments, when the region of the panel used to contact with or abut on the user's body is a plane, the normal line may satisfy a general definition of a normal line. That is, the normal line may be a dashed line perpendicular to the plane. In some embodiments, when the region of the panel used to contact with or abut on the user's body is a curved surface, the normal line may be an average normal line of the region. As used herein, the average normal line may be defined as:

$$\hat{r}_0 = \frac{\oiint_S \hat{r}\, ds}{\left|\oiint_S \hat{r}\, ds\right|} \quad (1)$$

As used herein, $\hat{r}_0$ is the average normal line; $\hat{r}$ is a normal line of any point on the surface, and ds is a surface element.

Further, the curved surface may be a quasi-plane close to a plane, that is, a surface where an included angle between the normal of any point in at least 50% of the region of the curved surface and the average normal line is less than a set threshold. In some embodiments, the set threshold may be less than 10 degrees. In some embodiments, the set threshold may be further less than 5 degrees.

In some embodiments, the straight line B where the driving force is along and a normal line A' of the region on the panel 103 used to contact with or abut on the user's body may have the included angle θ. The included angle θ may be in a range of 0 to 180 degrees. Further, the included angle θ may be in a range of 0 to 180 degrees and not equal to 90 degrees. In some embodiments, the straight line B may be set to be in a positive direction pointing out of the speaker, the normal line A of the panel 103 (or the normal line A' of a contact surface between the panel 103 and the human skin) may be set to be in a positive direction pointing out of the speaker, an included angle θ between the normal line A or A' and the straight line B in the positive direction may be an acute angle, that is, in a range of 0 to 90 degrees. More descriptions regarding the normal line A and the normal line A' may be found in FIG. 18 and related descriptions, which may not be repeated herein.

Figure 17:
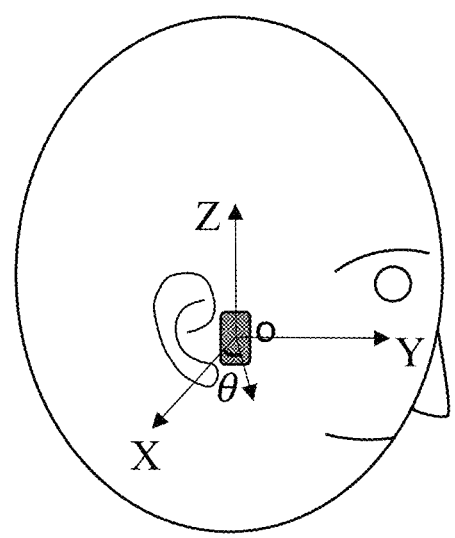
FIG. 17 is a schematic diagram illustrating an angle direction according to some embodiments of the present disclosure.

FIG. 17 is a schematic diagram illustrating an angle direction according to some embodiments of the present disclosure. As shown in FIG. 17, in some embodiments, a driving force generated by a driving device may have components in a first quadrant and/or a third quadrant of a plane coordinate system XOY. As used herein, the plane coordinate system XOY is a reference coordinate system, and the origin O of the plane coordinate system XOY is located on a contact surface between a panel and/or a housing and a human body after a bone conduction speaker is worn on a human body. The X-axis may be parallel to a coronal axis of the human body and the Y-axis may be parallel to a sagittal axis of the human body. A positive direction of the X-axis may face toward the outside of the human body, and a positive direction of the Y-axis may face toward the front of the human body. The quadrant should be understood as four regions divided by a horizontal axis (e.g., the X-axis) and a vertical axis (e.g., the Y-axis) in a plane rectangular coordinate system, and each region is called a quadrant. The quadrants are centered at the origin, and the X-axis and Y-axes are the dividing lines. The upper right region (a region enclosed by a positive half axis of the X-axis and a positive half axis of the Y-axis) is called the first quadrant, the upper left region (a region enclosed by a negative half axis of the X-axis and the positive half axis of the Y-axis) is called a second quadrant, the lower left region (a region enclosed by the negative half axis of the X-axis and a negative half axis of the Y-axis) is called the third quadrant, and the lower right region (a region enclosed by the positive half axis of the X-axis and the negative half axis of the Y-axis) is called a fourth quadrant. As used herein, a point on the coordinate axis may not belong to any quadrant. It should be understood that the driving force in this embodiment may be directly located in the first quadrant and/or third quadrant of the plane coordinate system XOY. Alternatively, the driving force may be directed in other directions, but a projection or component in the first quadrant and/or the third quadrant of the plane coordinate system XOY is not zero, and the projection or component in a Z-axis direction may be zero or not be zero. As used herein, the Z-axis is perpendicular to the plane XOY and passes through the origin O. In some specific embodiments, a minimum included angle θ between the straight line where the driving force is along and the normal line of the region on the panel that is in contact with or abutting on the user's body may be any acute angle. For example, preferably, the included angle θ may be in a range of 5-80 degrees. More preferably, the included angle θ may be in a range of 15-70 degrees. More preferably, the included angle θ may be in a range of 25-60 degrees. More preferably, the included angle θ may be in a range of 25-50 degrees. More preferably, the included angle θ may be in a range of 28-50 degrees. More preferably, the included angle θ may be in a range of 30-39 degrees. More preferably, the included angle θ may be in a range of 31-38 degrees. Further preferably, the included angle θ may be in a range of 32-37 degrees. Further preferably, the included angle θ may be in a range of 33-36 degrees. Further preferably, the included angle θ may be in a range of 33-35.8 degrees. Further preferably, the included angle θ may be in a range of 33.5-35 degrees. Specifically, the included angle θ may be 26 degrees, 27 degrees, 28 degrees, 29 degrees, 30 degrees, 31 degrees, 32 degrees, 33 degrees, 34 degrees, 34.2 degrees, 35 degrees, 35.8 degrees, 36 degrees, 37 degrees, 38 degrees, etc., and an error may be controlled within 0.2 degree. It should be noted that the above description of the direction of the driving force should not be interpreted as a limitation of the driving force in the present disclosure. In other embodiments, the driving force may also have components in the second and fourth quadrants of the plane coordinate system XOY. Even the driving force may be along the Y-axis, etc.

Figure 18:
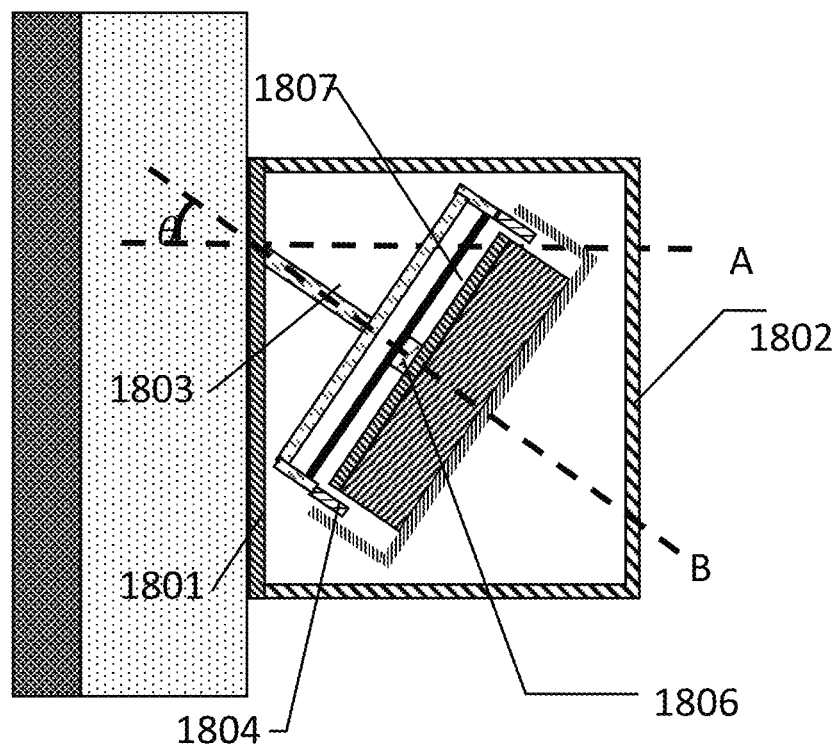
FIG. 18 is a structural schematic diagram illustrating a speaker acting on human skin and bones according to some embodiments of the present disclosure.

FIG. 18 is a structural schematic diagram illustrating a bone conduction speaker acting on human skin and bones according to some embodiments of the present disclosure.

In some embodiments, a straight line where a driving force is along may be collinear or parallel to a straight line where a drive device vibrates. For example, in a driving device based on a moving coil principle, a direction of the driving force may be the same as or opposite to a vibration direction of a coil and/or a magnetic circuit assembly. A panel may be flat or curved. Alternatively, the panel may have a number of protrusions or grooves. In some embodiments, when a bone conduction speaker is worn on a user's body, a normal line of a region on the panel that is in contact with or abuts on the user's body is not parallel to the straight line where the driving force is along. Generally speaking, the region on the panel that is in contact with or abuts on the user's body may be relatively flat. Specifically, the region may be a plane or a quasi-plane with little curvature. When the region on the panel used to contact with or abut on the user's body is a plane, a normal line of any point on the region may be used as a normal line of the region. At this time, the normal line A of the panel 103 and a normal line A' of a contact surface where the panel 103 is in contact with human skin may be parallel or coincident. When the region on the panel used to contact with or abut on the user's body is not a plane, the normal line of the region may be an average normal line of the region. The detailed definition of the average normal line may be referred to the related description in FIG. 16, which will not be repeated herein. In some other embodiments, when the region on the panel used to contact with or abut on the user's body is not a plane, the normal line of the region may also be determined as follows: selecting a certain point in a region when the panel is in contact with the human skin, determining a tangent plane of the panel at this point, determining a straight line that passes through the point and is perpendicular to the tangent plane, and designating the straight line as the normal line of the panel. When the region on the panel used to contact with or abut on the user's body is not a plane, the selected point may be different, the tangent plane of the panel at the point may be different, and the determined normal line may be differ-ent. At this time, the normal line A' and the normal line A of the panel may not be parallel. According to a specific embodiment of the present disclosure, the straight line where the driving force is along (or the straight line where the driving device vibrates) may have an included angle θ with the normal line of the region, and the included angle may be in a range of 0 to 180 degrees. In some embodiments, when the straight line where the driving force is along has a positive direction pointing out of the bone conduction speaker through the panel (or a contact surface of the panel and/or the housing and the human skin) and the normal line of the panel (or the contact surface of the panel and/or the housing and the human body) has a positive direction pointing out of the bone conduction speaker, the included angle formed by the two straight lines in the positive direction may be an acute angle.

As shown in FIG. 18, the bone conduction speaker may include a driving device (also referred to as a transducing device in other embodiments), a transmission assembly 1803, a panel 1801, and a housing 1802. In some embodiments, a coil 1804 and a magnetic circuit assembly 1807 may be both ring-shaped structures. In some embodiments, the driving device may be a moving coil driving manner, and include the coil 1804 and the magnetic circuit assembly 1807.

In some embodiments, the coil 1804 and the magnetic circuit assembly 1807 may have axes parallel to each other. The axis of the coil 1804 or the magnetic circuit assembly 1807 may be perpendicular to a radial plane of the coil 1804 and/or a radial plane of the magnetic circuit assembly 1807. In some embodiments, the coil 1804 and the magnetic circuit assembly 1807 may have a same central axis. The central axis of the coil 1804 may be perpendicular to the radial plane of the coil 1804 and pass through a geometric center of the coil 1804. The central axis of the magnetic circuit component 1807 may be perpendicular to the radial plane of the magnetic circuit component 1807 and pass through a geometric center of the magnetic circuit component 1807. The axis of the coil 1804 or the magnetic circuit assembly 1807 and the normal line of the panel 1801 may form the aforementioned angle θ.

Merely by way of example, referring to FIG. 18, a relationship between the driving force F and a skin deformation S may be explained below. When the straight line where the driving force generated by the driving device is along is parallel to the normal line of the panel 1801 (i.e., the included angle is zero), the relationship between the driving force and a total skin deformation may be:

$$F_\perp = S_\perp \times E \times A / h \tag{2}$$

As used herein, $F_\perp$ is the driving force, $S_\perp$ is the total deformation of the skin in a direction perpendicular to the skin, E is an elastic modulus of the skin, A is a contact area between the panel and the skin, and h is a total thickness of the skin (i.e., a distance between the panel and the bone).

When the straight line where the driving force of the driving device is along is perpendicular to the normal line of the region on the panel that is in contact with or abuts on the user's body (i.e., the angle θ is 90 degrees), a relationship between the driving force in a vertical direction and the total skin deformation may be determined as Equation (3):

$$F_{//} = S_{//} \times G \times A / h \tag{3}$$

As used herein, $F_{//}$ is a magnitude of the driving force, $S_{//}$ is a total deformation of the skin in a direction parallel to the skin, G is a shear modulus of the skin, A is the contact area between the panel and the skin, and h is the total thickness of the skin (i.e., the distance between the panel and the bone).

The relationship between the shear modulus and the elastic modulus may be:

$$G=E/2(1+\gamma) \quad (4)$$

where $\gamma$ is the Poisson's ratio of the skin, $0<\gamma<0.5$, so the shear modulus may be smaller than the elastic modulus, correspondingly, the total deformation of the skin may be $S_{//}>S_{\perp}$ under a same driving force. Generally, the Poisson's ratio of the skin may be close to 0.4.

When the straight line where the driving force is generated by the driving device is not parallel to the normal line of the region where the panel is in contact with the user's body, a horizontal driving force and a vertical driving force may be expressed as the following Equation (5) and Equation (6), respectively:

$$F_{\perp}=F\times\cos(\theta) \quad (5)$$

$$F_{//}=F\times\sin(\theta) \quad (6)$$

As used herein, a relationship between driving force and skin deformation may be expressed by the following equation:

$$S = \sqrt[2]{S_{\perp}^2 + S_{//}^2} = \frac{h}{A} \times F \times \sqrt[2]{(\cos(\theta)/E)^2 + (\sin(\theta)/G)^2} \quad (7)$$

When the Poisson's ratio of the skin is 0.4, the detailed description of the relationship between the included angle and the total skin deformation may be referred to the specific content elsewhere in the present disclosure.

Figure 19:
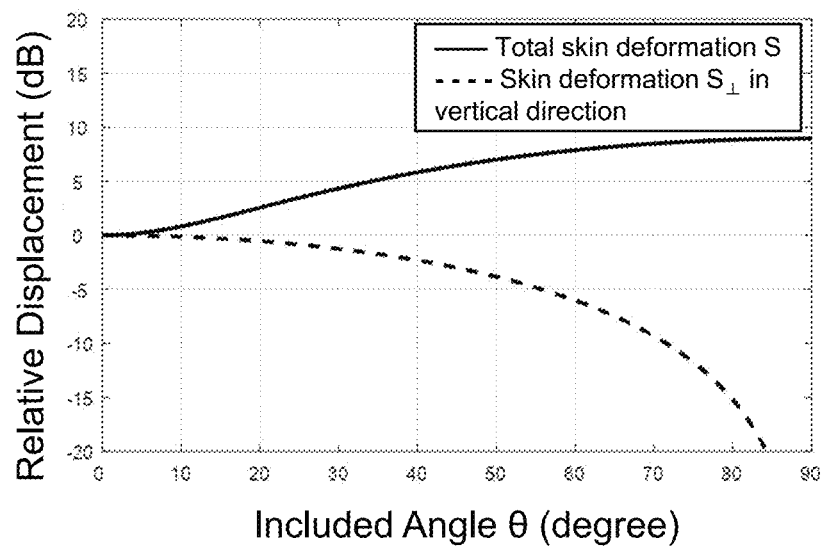
FIG. 19 is a diagram illustrating a relationship between an included angle and a relative displacement of a speaker according to some embodiments of the present disclosure.

FIG. 19 is a diagram illustrating a relationship of an included angle and a relative displacement of a bone conduction speaker according to some embodiments of the present disclosure. As shown in FIG. 19, the relationship between the included angle and a total skin deformation may be that the larger the included angle $\theta$, the greater the relative displacement, and the greater the total skin deformation S. As the included angle increases, the relative displacement may decrease, and the skin deformation $S_{\perp}$ of the skin in the vertical direction may decrease. When the included angle is close to 90 degrees, the skin deformation $S_{\perp}$ of the skin in the vertical direction may gradually tend to zero.

A volume of the bone conduction speaker in a low frequency part may be positively correlated with the total skin deformation S. The greater the S, the greater the volume of the bone conduction in the low frequency. The volume of the bone conduction speaker component in a high frequency part may be positively correlated with the skin deformation $S_{\perp}$ in the vertical direction. The bigger the skin deformation $S_{\perp}$ in the vertical direction, the greater the volume of the bone conduction in the high frequency.

When the Poisson's ratio of the skin is 0.4, the detailed description of the relationship between the included angle $\theta$ and the total skin deformation S and the relationship between the included angle $\theta$ and the skin deformation $S_{\perp}$ in the vertical direction may be found in FIG. 19. As shown in FIG. 19, the relationship between the included angle $\theta$ and the total skin deformation S may be that the greater the included angle $\theta$, the greater the total skin deformation S, and the greater the corresponding volume of the bone conduction speaker in the low frequency. As shown in FIG. 19, the relationship between the included angle $\theta$ and the skin deformation $S_{\perp}$ in the vertical direction may be that the greater the included angle $\theta$, the smaller the skin deformation $S_{\perp}$ in the vertical direction, and the smaller the corresponding volume of the bone conduction speaker in the high frequency.

According to Equation (7) and the curve in FIG. 19, with the increase of the included angle $\theta$, a speed of the increase of the total deformation of skin S and a speed of the decrease of the skin deformation $S_{\perp}$ in the vertical direction may be different. The speed of the increase of the total deformation of skin S may be fast at first and then become slow, and the speed of the decrease of the skin deformation $S_{\perp}$ in the vertical direction may be faster and faster. To balance the volume of the low frequency and high frequency components of the bone conduction speaker, the included angle $\theta$ may be in a suitable range. For example, a range of $\theta$ may be 5-80 degrees, 15-70 degrees, 25-50 degrees, or 25-35 degrees, 25-30 degrees, etc.

Figure 20:
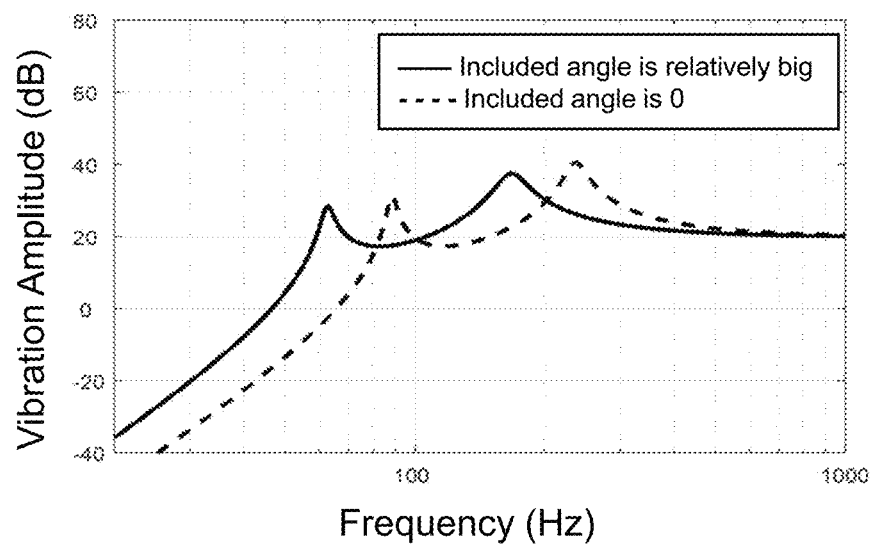
FIG. 20 is a schematic diagram illustrating a low-frequency part of a frequency response curve of a speaker with different included angles $\theta$ according to some embodiments of the present disclosure.

FIG. 20 is a schematic diagram illustrating a low-frequency part of a frequency response curve of a bone conduction speaker with different included angles $\theta$ according to some embodiments of the present disclosure. As shown in FIG. 20, a panel may be in contact with skin and transmit vibrations to the skin. In this process, the skin may also affect the vibration of the bone conduction speaker, thereby affecting the frequency response curve of the bone conduction speaker. According to the above analysis, it should be found that the greater the included angle, the greater a total deformation of the skin under a same driving force. For the bone conduction speaker, it may be equivalent to a reduction in the elasticity of the skin relative to the panel. It may be further understood that when a certain angle $\theta$ is formed between a straight line where the driving force of the driving device is along and a normal line of a region on the panel that is in contact with or abutting on a user's body, especially when the angle $\theta$ increases, a formant of the low frequency region in the frequency response curve may be adjusted to a lower frequency region, so that the low frequency may dive deeper and the low frequency may increase. Compared with other technical means to improve the low-frequency components of the sound, such as adding a vibration plate to the bone conduction speaker, the included angle may effectively suppress the increase of the sense of vibration while increasing the low-frequency energy, thereby reducing the sense of vibration. Therefore, low-frequency sensitivity of the bone conduction speaker may be significantly improved, thereby improving sound quality and human experience. It should be noted that, in some embodiments, increasing the low frequency and decreasing the sense of vibration means that when the included angle $\theta$ increases in a range of 0 to 90 degrees, energy in the low frequency range of the vibration or sound signal may increase, and the sense of vibration may also increase simultaneously, but the energy in the low-frequency range has increased to a greater degree than the sense of vibration. Therefore, in terms of relative effects, the sense of vibration may be relatively decreased. According to FIG. 20, when the included angle is large, the formant in the low frequency region appears in a lower frequency range, which may extend a flat part of a frequency curvature in a disguised manner, thereby improving the sound quality of the speaker.

It should be noted that the above description of the bone conduction speaker is only a specific example and should not be regarded as the only feasible implementation. Obviously, for those skilled in the art, after understanding the basic principle of the bone conduction speaker, it may be possible to make various modifications and variations in the form and details of the specific method and operation of implementing the bone conduction speaker without departing from these principles, but these modifications and variations are still within the scope described above. For example, a minimum angle θ between the straight line where the driving force is along and the normal line of the region on the panel used to contact with or abut on the user's body may be any acute angle. The acute angle herein may not be limited to the above 5-80 degrees. The included angle θ may be less than 5 degrees, such as 1 degree, 2 degrees, 3 degrees, 4 degrees, etc. In other embodiments, the included angle θ may be greater than 80 degrees and less than 90 degrees, such as 81 degrees, 82 degrees, 85 degrees, etc. In some embodiments, the specific value of the included angle θ may not be an integer (e.g., 81.3 degrees, 81.38 degrees). Such deformations are all within the protection scope of the present disclosure.

Figure 21:
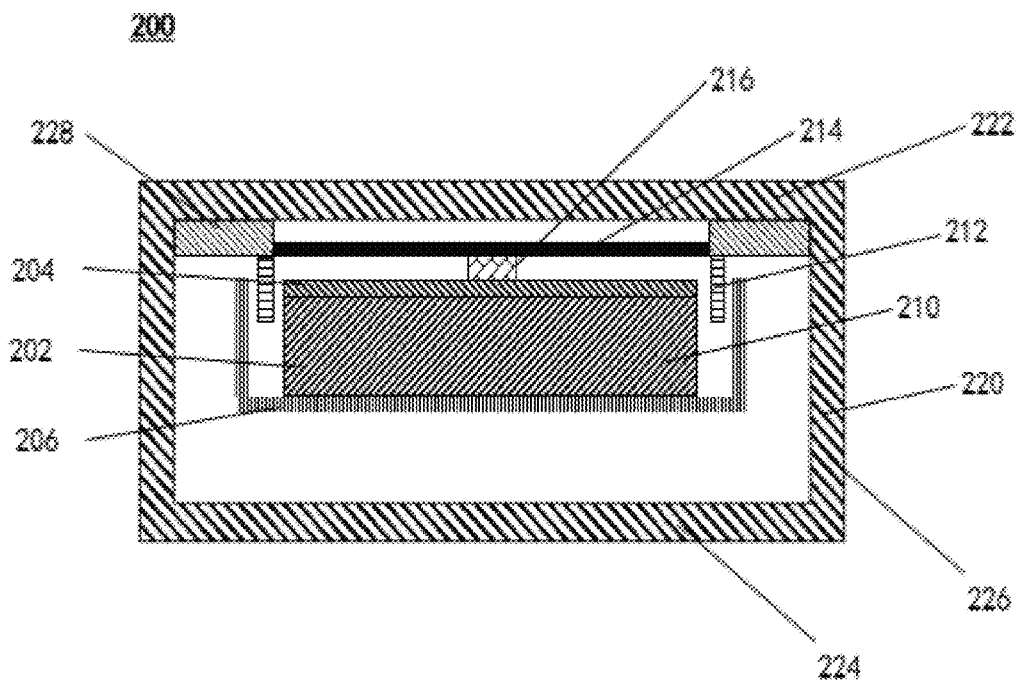
FIG. 21 is a schematic diagram illustrating a longitudinal sectional view of a speaker according to some embodiments of the present disclosure.

FIG. 21 illustrates a longitudinal sectional view of a speaker according to some embodiments of the present disclosure. It should be noted that the speaker 200 in FIG. 21 is equivalent to the speaker 21 in FIG. 1 and FIG. 16. Referring to FIG. 16, an earphone housing 220 may correspond to the housing 104, a transmission vibration plate 214, and a connection piece 216 may correspond to the transmission assembly 102, and a magnetic circuit assembly 210 may correspond to the earphone core 101. As shown in FIG. 21, in some embodiments, the speaker 200 may include the magnetic circuit assembly 210, the coil 212, the transmission vibration plate 214, the connection piece 216, and the earphone housing 220. The magnetic circuit assembly 210 may include a first magnetic element 202, a first magnetic guide element 204, and a second magnetic guide element 206.

In some embodiments, the earphone housing 220 may include a housing panel 222, a housing back 224, and a housing side 226. The housing back 224 may be located on a side opposite to the housing panel 222, and respectively disposed on two ends of the housing side 226. The housing panel 222, the housing back 224, and the housing side 226 may form an integral structure with a certain accommodation space. In some embodiments, the magnetic circuit assembly 210, the coil 212, and the transmission vibration plate 214 may be fixed inside the earphone housing 220. In some embodiments, the speaker 200 may further include a housing bracket 228. The vibration transmission piece 214 may be connected to the earphone housing 220 through the housing bracket 228. The coil 212 may be fixed on the housing bracket 228. The housing 220 may be driven to vibrate by the housing bracket 228. In some embodiments, the housing bracket 228 may be a part of the earphone housing 220. Alternatively, the housing bracket 228 may be a separate component, directly or indirectly connected to the inside of the earphone housing 220. In some embodiments, the housing bracket 228 may be fixed on an inner surface of the housing side 226. In some embodiments, the housing bracket 228 may be pasted on the earphone housing 220 by glue, or be fixed on the earphone housing 220 by stamping, injection molding, clamping, riveting, screw connection, or welding.

In some embodiments, it may be possible to design a connection manner between the housing panel 222, the housing back 224, and the housing side 226 to ensure that the earphone housing 220 has a greater rigidity. For example, the housing panel 222, the housing back 224, and the housing side 226 may be integrally formed. As another example, the housing back 224 and the housing side 226 may be an integral structure. The housing panel 222 and the housing side 226 may be directly pasted and fixed by glue, or fixed by means of clamping, welding, or screw connection. The glue may be glue with strong viscosity and high hardness. Still another example, the housing panel 222 and the housing side 226 may be an integral structure, and the housing back 224 and the housing side 226 may be directly pasted and fixed by glue, or fixed by the clamping, welding, or screw connection. In some embodiments, the housing panel 222, the housing back 224, and the housing side 226 may be all independent components, and the three components may be connected and fixed by one or a combination of the glue, clamping, welding, or screw connection. For example, the housing panel 222 and the housing side 226 may be connected by glue, and the housing back 224 and the housing side 226 may be connected by the clamping, welding, or screw connection. Alternatively, the housing back 224 and the housing side 226 may be connected by glue, and the housing panel 222 and the housing side 226 may be connected by the clamping, welding, or screw connection.

In different application scenarios, the housing described in the present disclosure may be made by different assembly manners. For example, as described elsewhere in the present disclosure, the housing may be integrally formed, split assembled, or a combination of the two manners. In the split assembling, different splits may be pasted and fixed by glue, or fixed by the clamping, welding or screw connection. Specifically, in order to better understand the assembly manner of the earphone housing in the present disclosure, FIGS. 22-24 may describe several examples of the assembly manner of the housing.

Figure 22:
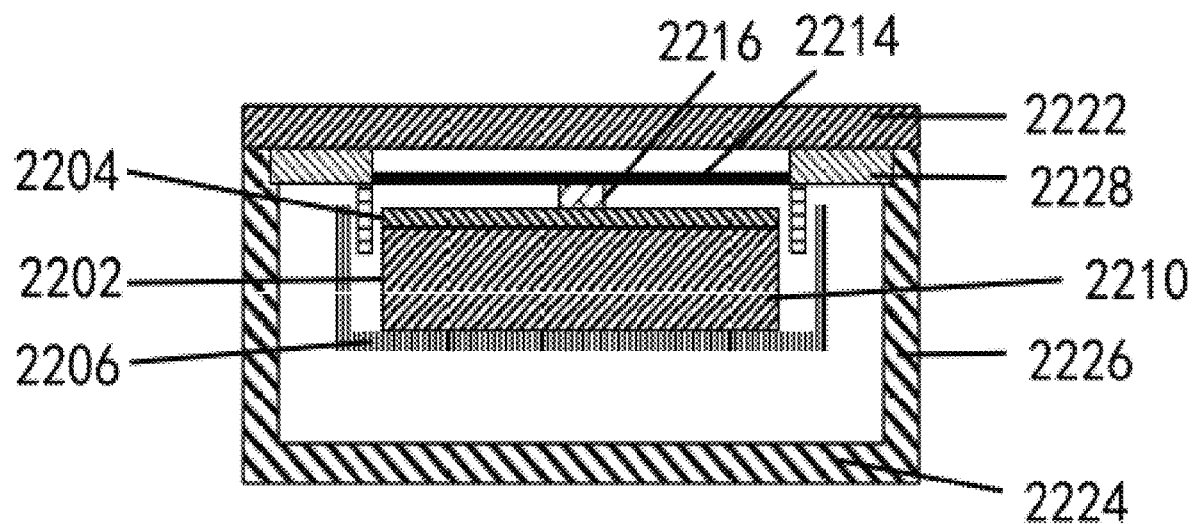
FIG. 22 is a schematic diagram illustrating a structure of a speaker according to some embodiments of the present disclosure.

As shown in FIG. 22, the speaker may mainly include a magnetic circuit assembly 2210 and a housing. In some embodiments, the magnetic circuit assembly 2210 may include a first magnetic element 2202, a first magnetic guide element 2204, and a second magnetic guide element 2206. The housing may include a housing panel 2222, a housing back 2224, and a housing side 2226. The housing side surface 2226 and the housing back surface 2224 may be made in an integral manner, and the housing panel 2222 may be connected to one end of the housing side 2226 through the split assembling. The split assembling may include fixing the housing panel 2222 to one end of the housing side 2226 by using glue, or by means of clamping, welding or screw connection. The housing panel 2222 and the housing side 2226 (or the housing back 2224) may be made of different materials, a same material, or partly same materials. In some embodiments, the housing panel 2222 and the housing side 2226 may be made of the same material, and a Young's modulus of the same material may be greater than 2000 MPa. More preferably, the Young's modulus of the same material may be greater than 4000 MPa. More preferably, the Young's modulus of the same material may be greater than 6000 MPa. More preferably, the Young's modulus of the earphone housing 220 material may be greater than 8000 MPa. More preferably, the Young's modulus of the same material may be greater than 12000 MPa. More preferably, the Young's modulus of the same material may be greater than 15000 MPa. Further preferably, the Young's modulus of the same material may be greater than 18000 MPa. In some embodiments, the housing panel 2222 and the housing side 2226 may be made of different materials, and Young's moduli of the different materials may be greater than 4000 MPa. More preferably, the Young's moduli of the different materials may be all greater than 6000 MPa. More preferably, the Young's moduli of the different materials may be greater than 8000 MPa. More preferably, the Young's moduli of the different materials are all greater than 12000 MPa. More preferably, the Young's moduli of the different materials may be greater than 15000 MPa. Further preferably, the Young's moduli of the different materials may be greater than 18000 MPa. In some embodiments, the material of the housing panel 2222 and/or the housing side 2226 may include but not be limited to AcrYlonitrile butadiene styrene (ABS), PolYstYrene (PS), high High impact polYstYrene (HIPS), PolYpropYlene (PP), PolYethYlene terephthalate (PET), PolYester (PES), PolYcarbonate (PC), PolYam ides (PA), PolYvinYl chloride (PVC), PolYurethanes (PU), PolYvinYlidene chloride, PolYethYlene (PE), PolYmethYl methacrylate (PMMA), PolYetheretherketone (PEEK), Phenolics (PF), Urea-formaldehYde (UF), melamine formaldehyde (MF), some metals, alloy (e.g., aluminum alloy, chromium-molybdenum steel, scandium alloy, magnesium alloy, titanium alloy, magnesium-lithium alloy, nickel alloy, etc.), glass fiber, carbon fiber, or any combination of thereof. In some embodiments, the material of the housing panel 2222 may be any combination of glass fiber, carbon fiber, polycarbonate (PC), PolYam ides (PA), and other materials. In some embodiments, the material of the housing panel 2222 and/or the housing side 2226 may be made by mixing carbon fiber and polycarbonate (PC) in a certain ratio. In some embodiments, the material of the housing panel 2222 and/or the housing side 2226 may be made by mixing carbon fiber, glass fiber, and polycarbonate (PolYcarbonate, PC) in a certain proportion. In some embodiments, the material of the housing panel 2222 and/or the housing side 2226 may be made by mixing glass fiber and PolYcarbonate (PC) in a certain proportion, or made of glass fiber and PolYamides (PA) in a certain proportion.

In some embodiments, the housing panel 2222, the housing back 2224, and the housing side 2226 may form an integral structure with a certain accommodation space. In the integral structure, the vibration transmission plate 2214 may be connected to the magnetic circuit assembly 2210 through the connection member 2216. Two sides of the magnetic circuit assembly 2210 may be respectively connected to the first magnetic guide element 2204 and the second magnetic guide element 2206. The vibration transmission plate 2214 may be fixed inside the overall structure through the housing bracket 2228. In some embodiments, the housing side 2226 may have a step structure for supporting the housing bracket 2228. After the housing support 2228 is fixed to the housing side 2226, the housing panel 2222 may be fixed on the housing support 2228 and the housing side 2226 at the same time, or separately fixed on the housing support 2228 or the housing side 2226. In this case, optionally, the housing side 2226 and the housing bracket 2228 may be integrally formed. In some embodiments, the housing bracket 2228 may be directly fixed on the housing panel 2222 (e.g., by means of glue, clamping, welding, or screw connection). The fixed housing panel 2222 and housing bracket 2228 may be then fixed to the housing side (e.g., by means of glue, clamping, welding, or screw connection). In this case, optionally, the housing bracket 2228 and the housing panel 2222 may be integrally formed.

Figure 23:
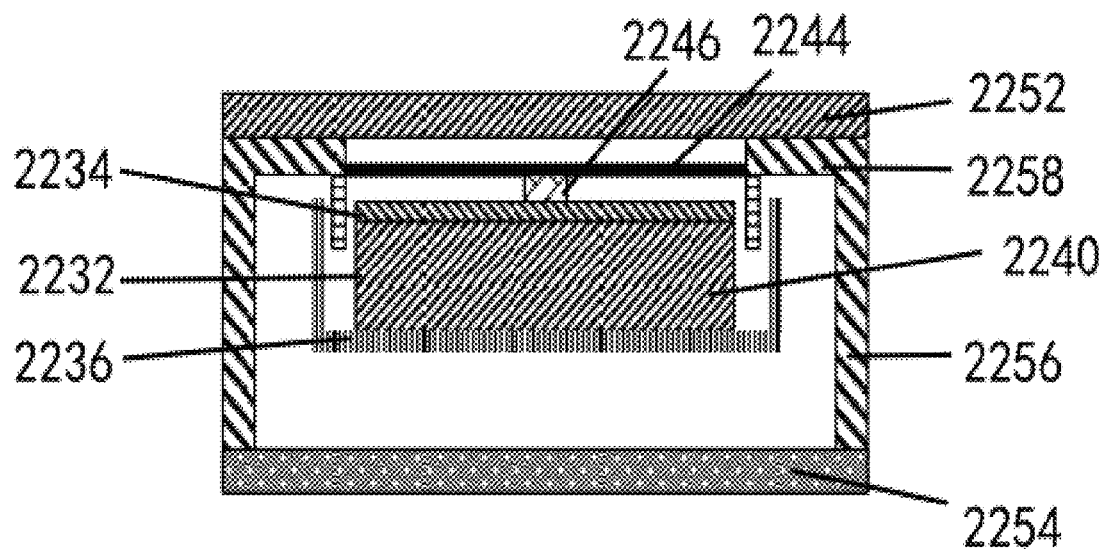
FIG. 23 is a schematic diagram illustrating a structure of another speaker according to some embodiments of the present disclosure.

In another specific embodiment, as shown in FIG. 23, the speaker may mainly include a magnetic circuit assembly 2240 and a housing. As used herein, the magnetic circuit assembly 2240 may include a first magnetic element 2232, a first magnetic guide element 2234, and a second magnetic guide element 2236. In the integral structure, a vibration transmission plate 2244 may be connected to the magnetic circuit assembly 2240 through a connection member 2246. A difference between the embodiment and the embodiment provided in FIG. 22 may be that a housing bracket 2258 and the housing side 2256 are integrally formed. The housing panel 2252 may be fixed on one side of the housing side 2256 connected to the housing bracket 2258 (e.g., by means of glue, clip, welding, or screw connection), and the housing back 2254 may be fixed on the other side of the housing side 2256 (e.g., by means of glue, clamping, welding, or screw connection, etc.). In this case, optionally, the housing support 2258 and the housing side 2256 may be a split assembled structure, and the housing panel 2252, the housing back 2254, the housing support 2258, and the housing side 2256 may be all pasted and fixed by glue, clamping, welding, or screw connection for fixed connection.

Figure 24:
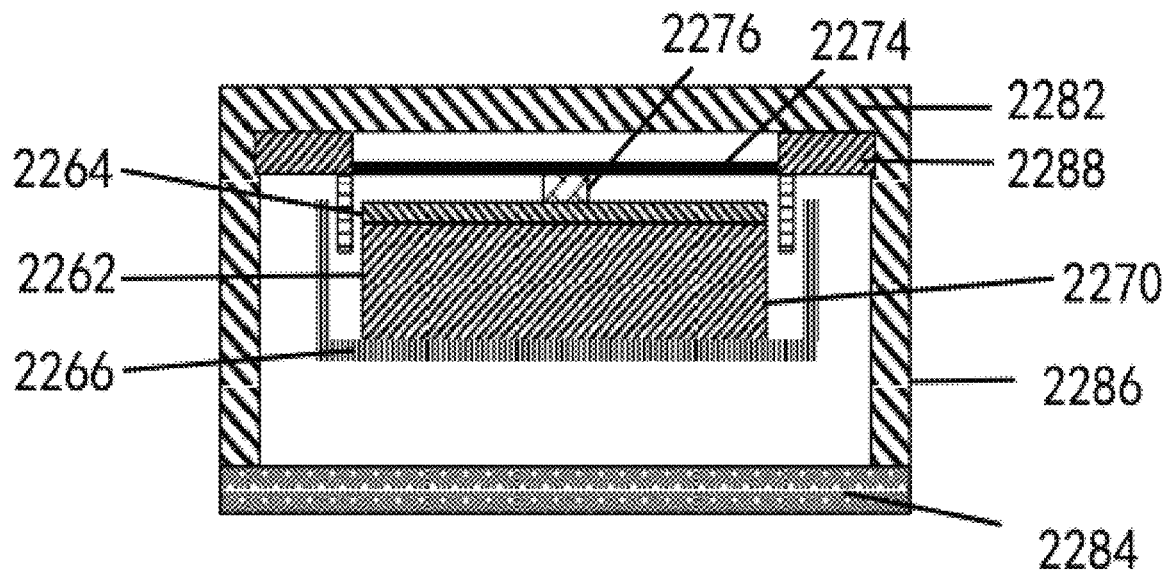
FIG. 24 is a schematic diagram illustrating a structure of still another speaker according to some embodiments of the present disclosure

In another specific embodiment, as shown in FIG. 24, the speaker in the embodiment may mainly include a magnetic circuit assembly 2270 and a housing. As used herein, the magnetic circuit assembly 2270 may include a first magnetic element 2262, a first magnetic guide element 2264, and a second magnetic guide element 2266. In the integral structure, a vibration transmission plate 2274 may be connected to the magnetic circuit assembly 2270 through a connection member 2276. A difference between this embodiment and the embodiment provided in FIG. 23 may be that the housing panel 2282 and the housing side surface 2286 are integrally formed. The housing back 2284 may be fixed on the housing side 2286 opposite to one side of the housing panel 2282 (e.g., by means of glue, clamping, welding or screw connection). The housing bracket 2288 may be fixed on the housing panel 2282 and/or the housing side 2286 by means of glue, clamping, welding or screw connection. In this case, optionally, the housing bracket 2288, the housing panel 2282, and the housing side 2286 may be integrally formed.

Figure 25:
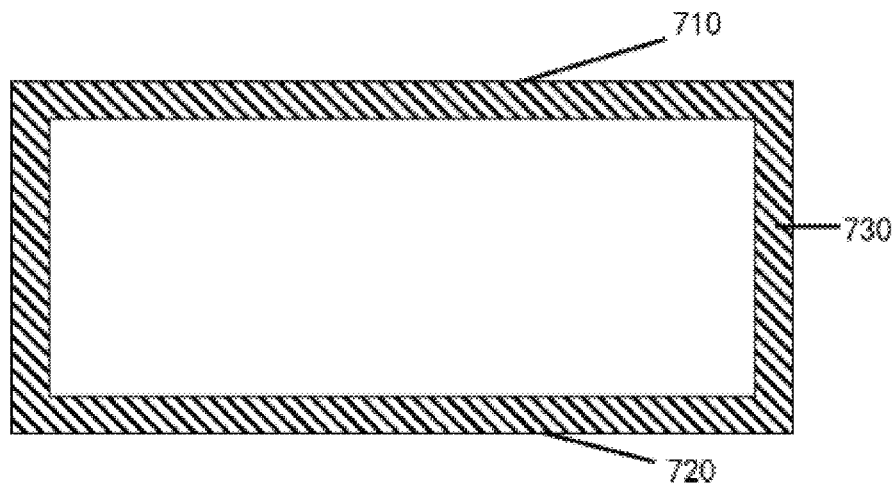
FIG. 25 is a schematic diagram illustrating a housing structure of a speaker according to some embodiments of the present disclosure.

FIG. 25 is a schematic diagram illustrating a housing structure of a speaker according to some embodiments of the present disclosure. As shown in FIG. 25, the housing 700 may include a housing panel 710, a housing back 720, and a housing side 730. The housing panel 710 may be in contact with a human body, and transmit a vibration of the speaker to auditory nerve of the human body. In some embodiments, when an overall rigidity of the housing 700 is relatively large, vibration amplitudes and phases of the housing panel 710 and the housing back 720 may remain the same or substantially same (the housing side 730 does not compress air and therefore does not generate sound leakage) within a certain frequency range, so that a first sound leakage signal generated by the housing panel 710 and a second sound leakage signal generated by the housing back 720 may be superimposed on each other. The superposition may reduce the amplitude of a first leakage sound wave or a second leakage sound wave, thereby achieving a purpose of reducing the sound leakage of the housing 700. In some embodiments, the certain frequency range may include at least a part of frequencies greater than 500 Hz. Preferably, the certain frequency range may include at least a part of frequencies greater than 600 Hz. Preferably, the certain frequency range may include at least a part of frequencies greater than 800 Hz. Preferably, the certain frequency range may include at least a part of frequencies greater than 1000 Hz. Preferably, the certain frequency range may include at least a part of frequencies greater than 2000 Hz. More preferably, the certain frequency range may include at least a part of frequencies greater than 5000 Hz. More preferably, the certain frequency range may include at least a part of frequencies greater than 8000 Hz. Further preferably, the certain frequency range may include at least a part of frequencies greater than 10000 Hz.

In some embodiments, the rigidity of the housing of the speaker may affect the vibration amplitudes and phases of different parts of the housing (e.g., the housing panel, the housing back, and/or the housing side), thereby affecting the sound leakage of the speaker. In some embodiments, when the housing of the speaker has a relatively large rigidity, the housing panel and the housing back may maintain a same or substantially same vibration amplitude and phase at a relatively high frequency, thereby significantly reducing the sound leakage of the speaker.

In some embodiments, the relatively high frequency may include a frequency larger than or equal to 1000 Hz, for example, a frequency between 1000 Hz and 2000 Hz, a frequency between 1100 Hz and 2000 Hz, a frequency between 1300 Hz and 2000 Hz, a frequency between 1500 Hz and 2000 Hz, a frequency between 1700 Hz and 2000 Hz, and a frequency between 1900 Hz and 2000 Hz. Preferably, the relatively high frequency mentioned herein may include a frequency larger than or equal to 2000 Hz, for example, a frequency between 2000 Hz and 3000 Hz, a frequency between 2100 Hz and 3000 Hz, a frequency between 2300 Hz and 3000 Hz, a frequency between 2500 Hz and 3000 Hz, a frequency between 2700 Hz and 3000 Hz, or a frequency between 2900 Hz and 3000 Hz. Preferably, the relatively high frequency may include a frequency larger than or equal to 4000 Hz, for example, a frequency between 4000 Hz and 5000 Hz, a frequency between 4100 Hz and 5000 Hz, a frequency between 4300 Hz and 5000 Hz, a frequency between 4500 Hz and 5000 Hz, a frequency between 4700 Hz and 5000 Hz, or a frequency between 4900 Hz and 5000 Hz. More preferably, the relatively high frequency may include a frequency larger than or equal to 6000 Hz, for example, a frequency between 6000 Hz and 8000 Hz, a frequency between 6100 Hz and 8000 Hz, a frequency between 6300 Hz and 8000 Hz, a frequency between 6500 Hz and 8000 Hz, a frequency between 7000 Hz and 8000 Hz, a frequency between 7500 Hz and 8000 Hz, or a frequency between 7900 Hz and 8000 Hz. Further preferably, the relatively high frequency may include a frequency larger than or equal to 8000 Hz, for example, a frequency between 8000 Hz and 12000 Hz, a frequency between 8100 Hz and 12000 Hz, a frequency between 8300 Hz and 12000 Hz, a frequency between 8500 Hz and 12000 Hz, a frequency between 9000 Hz and 12000 Hz, a frequency between 10000 Hz and 12000 Hz, or a frequency between 11000 Hz and 12000 Hz.

Maintaining the same or substantially same vibration amplitude of the housing panel and the housing back means that a ratio of the vibration amplitudes of the housing panel and the housing back is within a certain range. For example, the ratio of the vibration amplitude of the housing panel to the vibration amplitude of the housing back may be between 0.3 and 3. Preferably, the ratio may be between 0.4 and 2.5. Preferably, the ratio may be between 0.5 and 1.5. More preferably, the ratio may be between 0.6 and 1.4. More preferably, the ratio may be between 0.7 and 1.2. More preferably, the ratio may be between 0.75 and 1.15. More preferably, the ratio may be between 0.8 and 1.1. More preferably, the ratio may be between 0.8 and 1.1. More preferably, the ratio may be between 0.85 and 1.1. Further preferably, the ratio may be between 0.9 and 1.05. In some embodiments, the vibrations of the housing panel and the housing back may be represented by other physical quantities that can characterize the vibration amplitude. For example, sound pressures generated by the housing panel and the housing back at a point in the space may be used to represent the vibration amplitudes of the housing panel and the housing back.

Maintaining the same or substantially same vibration phase of the housing panel and the housing back means that a difference between the vibration phases of the housing panel and the housing back may be within a certain range. For example, the difference between the vibration phase of the housing panel and the vibration phase of the housing back may be between −90 degrees and 90 degrees. Preferably, the difference may be between −80 degrees and 80 degrees. Preferably, the difference may be between −60 degrees and 60 degrees. Preferably, the difference may be between −45 degrees and 45 degrees. More preferably, the difference may be between −30 degrees and 30 degrees. More preferably, the difference may be between −20 degrees and 20 degrees. More preferably, the difference may be between −15 degrees and 15 degrees. More preferably, the difference may be between −12 degrees and 12 degrees. More preferably, the difference may be between −10 degrees and 10 degrees. More preferably, the difference may be between −8 degrees and 8 degrees. More preferably, the difference may be between −6 degrees and 6 degrees. More preferably, the difference may be between −5 degrees and 5 degrees. More preferably, the difference may be between −4 degrees and 4 degrees. More preferably, the difference may be between −3 degrees and 3 degrees. More preferably, the difference may be between −2 degrees and 2 degrees. More preferably, the difference may be between −1 degrees and 1 degrees. Further preferably, the difference may be 0 degree.

It should be noted that the above description of the speaker is only a specific example, and should not be regarded as the only feasible implementation solution. Obviously, for those skilled in the art, after understanding the basic principle of the speaker, it may be possible to make various modifications and variations in the form and details of the specific method and operation of implementing the speaker without departing from these principles, but these modifications and variations are still within the scope described above. For example, the housing side, the housing back, and the housing bracket may be an integral structure. Such variations are all within the protection scope of the present disclosure.

Figure 26:
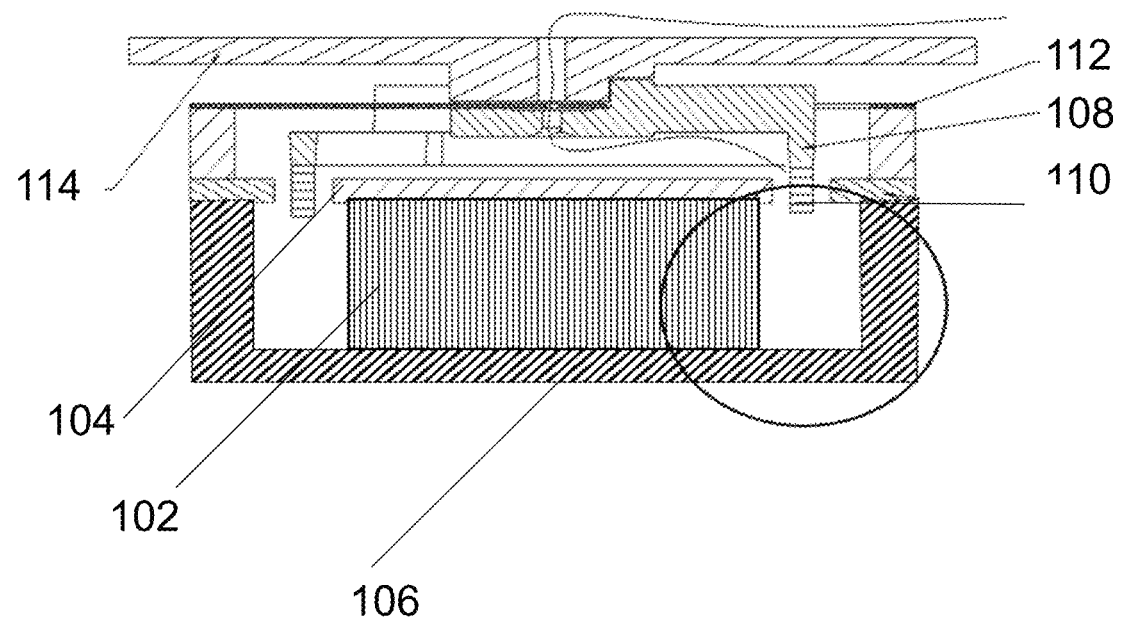
FIG. 26 is a schematic diagram illustrating a structure of a speaker according to some embodiments of the present disclosure.

FIG. 26 is a schematic diagram illustrating a vertical section of a speaker according to some embodiments of the present disclosure. As shown in FIG. 26, an earphone core 100 may include a first magnetic element 102, a first magnetic guide element 104, a second magnetic guide element 106, a first vibration plate 108, a voice coil 110, a second vibration plate 112, and a vibration panel 214. As used herein, a portion of elements of the earphone core in the speaker may form a magnetic circuit assembly. In some embodiments, the magnetic circuit assembly may include the first magnetic element 102, the first magnetic guide element 104, and the second magnetic guide element 106. The magnetic circuit assembly may generate a first full magnetic field (also referred to as "total magnetic field of the magnetic circuit component" or "first magnetic field").

A magnetic element described in the present disclosure refers to an element that may generate a magnetic field, such as a magnet. The magnetic element may have a magnetization direction, and the magnetization direction may refer to a magnetic field direction inside the magnetic element. The first magnetic element 102 may include one or more magnets. The first magnetic element may generate a second magnetic field. In some embodiments, a magnet may include a metal alloy magnet, a ferrite, or the like. The metal alloy magnet may include a neodymium iron boron, a samarium cobalt, an aluminum nickel cobalt, an iron chromium cobalt, an aluminum iron boron, an iron carbon aluminum, or the like, or a combination thereof. The ferrite may include a barium ferrite, a steel ferrite, a manganese ferrite, a lithium manganese ferrite, or the like, or a combination thereof.

In some embodiments, the lower surface of the first magnetic guide element 104 may be connected with the upper surface of the first magnetic element 102. The second magnetic guide element 106 may be connected with the first magnetic element 102. It should be noted that a magnetic guide element used herein may also be referred to as a magnetic field concentrator or iron core. The magnetic guide element may adjust the distribution of the magnetic field (e.g., the magnetic field generated by the first magnetic element 102). The magnetic guide element may be made of a soft magnetic material. In some embodiments, the soft magnetic material may include a metal material, a metal alloy, a metal oxide material, an amorphous metal material, or the like, for example, an iron, an iron-silicon based alloy, an iron-aluminum based alloy, a nickel-iron based alloy, an iron-cobalt based alloy, a low carbon steel, a silicon steel sheet, a silicon steel sheet, a ferrite, or the like. In some embodiments, the magnetic guide element may be manufactured by a way of casting, plastic processing, cutting processing, powder metallurgy, or the like, or any combination thereof. The casting may include a sand casting, an investment casting, a pressure casting, a centrifugal casting, etc. The plastic processing may include a rolling, a casting, a forging, a stamping, an extrusion, a drawing, or the like, or any combination thereof. The cutting processing may include a turning, a milling, a planning, a grinding, etc. In some embodiments, the processing means of the magnetic guide element may include a 3D printing, a CNC machine tool, or the like. The connection means between the first magnetic guide element 104, the second magnetic guide element 106, and the first magnetic element 102 may include a bonding, a clamping, a welding, a riveting, a bolting, or the like, or any combination thereof. In some embodiments, the first magnetic element 102, the first magnetic guide element 104, and the second magnetic guide element 106 may be configured as an axisymmetric structure. The axisymmetric structure may be an annular structure, a columnar structure, or other axisymmetric structures.

In some embodiments, a magnetic gap may be formed between the first magnetic element 102 and the second magnetic guide element 106. The voice coil 110 may be located within the magnetic gap. The voice coil 110 may be connected with the first vibration plate 108. The first vibration plate 108 may be connected with the second vibration plate 112, and the second vibration plate 112 may be connected with the vibration panel 114. When a current is passed into the voice coil 110, and the voice coil 110 may be located in a magnetic field formed by the first magnetic element 102, the first magnetic guide element 114, and the second magnetic guide element 106, and affected by an ampere force generated under the magnetic field. The ampere force may drive the voice coil 110 to vibrate, and the vibration of the voice coil 110 may drive the vibration of the first vibration plate 108, the second vibration plate 112, and the vibration panel 114. The vibration panel 114 may transmit the vibration to the auditory nerve through tissues and bones, so that a person hears the sound. The vibration panel 114 may directly contact the human skin, or may contact the skin through a vibration transmission layer composed of a specific material.

In some embodiments, for some speakers with a single magnetic element, the magnetic induction lines passing through the voice coil may be nonuniform and divergent. At the same time, a magnetic leakage may exist in the magnetic circuit. More magnetic induction lines may be outside the magnetic gap and fail to pass through the voice coil, so that the magnetic induction intensity (or magnetic field strength) at the position of the voice coil decreases, thereby affecting the sensitivity of the bone conduction speaker. Therefore, the earphone core 100 may further include at least one second magnetic element and/or at least one third magnetic guide element (not shown). The at least one second magnetic element and/or the at least one third magnetic guide element may suppress the leakage of the magnetic induction lines and restrict the shape of the magnetic induction lines passing through the voice coil, so that more magnetic lines pass through the voice coil as horizontally and densely as possible to enhance the magnetic induction intensity (or magnetic field strength) at the position of the voice coil, thereby improving the sensitivity and the mechanical conversion efficiency of the earphone core 100 (e.g., the efficiency of converting the electric energy input into the earphone core 100 into the mechanical energy of the voice coil vibration).

Figure 27:
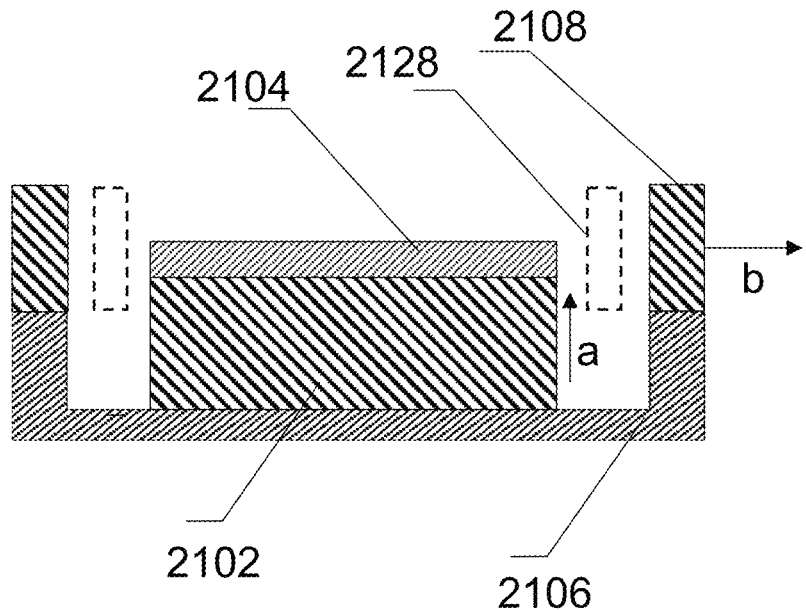
FIG. 27 is a schematic diagram illustrating a longitudinal sectional view of a magnetic circuit assembly 2100 according to some embodiments of the present disclosure.

FIG. 27 is a schematic diagram illustrating a longitudinal section view of a magnetic circuit assembly 2100 according to some embodiments of the present disclosure. As shown in FIG. 27, the magnetic circuit assembly 2100 may include a first magnetic element 2102, a first magnetic guide element 2104, a second magnetic guide element 2106, and a second magnetic element 2108. In some embodiments, the first magnetic element 2102 and/or the second magnetic element 2108 may include one or more magnets as described in the present disclosure. In some embodiments, the first magnetic element 2102 may include a first magnet, and the second magnetic element 2108 may include a second magnet. The first magnet may be the same as or different from the second magnet in types. The first magnetic guide element 2104 and/or the second magnetic guide element 2106 may include one or more permeability magnetic materials as described in the present disclosure. The first magnetic guide element 2104 and/or the second magnetic guide element 2106 may be manufactured using any one or more processing means as described in the present disclosure. In some embodiments, the first magnetic element 2102 and/or the first magnetic guide element 2104 may be axisymmetric. For example, the first magnetic element 2102 and/or the first magnetic guide element 2104 may be a cylinder, a rectangle parallelepiped, or a hollow ring (e.g., the cross section is the shape of a runway). In some embodiments, the first magnetic element 2102 and the first magnetic guide element 2104 may be coaxial cylinders with the same or different diameters. In some embodiments, the second magnetic guide element 306 may be a groove-type structure. The groove-type structure may include a U-shaped cross section (as shown in FIG. 26). The second magnetic guide element 2106 with the groove-type structure may include a baseplate and a side wall. In some embodiments, the baseplate and the side wall may be integrally formed. For example, the side wall may be formed by extending the baseplate in a direction perpendicular to the baseplate. In some embodiments, the baseplate may be connected with the side wall through any one or more connection means as described in the present disclosure. The second magnetic element 2108 may be provided in an annular shape or a sheet shape. In some embodiments, the second magnetic element 2108 may be in an annular shape. The second magnetic element 2108 may include an inner ring and an outer ring. In some embodiments, the shape of the inner ring and/or the outer ring may be a circle, an ellipse, a trigon, a quadrangle, or any other polygon. The second magnetic element 2108 may be composed of a plurality of magnets arranged one by one. Two ends of any one of the plurality of magnets may be connected with or have a certain spacing from two ends of an adjacent magnet. The space between two adjacent magnets may be the same or different. In some embodiments, the second magnetic element 2108 may be composed of two or three sheet-shaped magnets that are arranged equidistantly. The shape of the sheet-shaped magnets may be a fan shape, a quadrangular shape, or the like. In some embodiments, the second magnetic element 2108 may be coaxial with the first magnetic element 2102 and/or the first magnetic guide element 2104.

In some embodiments, the upper surface of the first magnetic element 2102 may be connected with the lower surface of the first magnetic guide element 2104. The lower surface of the first magnetic element 2102 may be connected with the baseplate of the second magnetic guide element 206. The lower surface of the second magnetic element 2108 may be connected with the side wall of the second magnetic guide element 2106. Connection means between the first magnetic element 2102, the first magnetic guide element 2104, the second magnetic guide element 2106, and/or the second magnetic element 2108 may include the bonding, the snapping, the welding, the riveting, the bolting, or the like, or any combination thereof.

In some embodiments, the magnetic gap may be configured between the first magnetic element 2102 and/or the first magnetic guide element 2104 and an inner ring of the second magnetic element 2108. A voice coil 2128 may be located within the magnetic gap. In some embodiments, the height of the second magnetic element 2108 and the voice coil 2128 relative to the baseplate of the second magnetic guide element 2106 may be equal. In some embodiments, the first magnetic element 2102, the first magnetic guide element 2104, the second magnetic guide element 2106, and the second magnetic element 2108 may form a magnetic circuit. In some embodiments, the magnetic circuit assembly 2100 may generate a first magnetic field (also referred to as "total magnetic field of the magnetic circuit component" or "first magnetic field"), and the first magnetic element 302 may generate a second magnetic field. The first magnetic field may be jointly formed by magnetic fields generated by all components (e.g., the first magnetic element 2102, the first magnetic guide element 2104, the second magnetic guide element 2106, and the second magnetic element 2108) in the magnetic circuit assembly 2100. The magnetic field strength (also referred to as magnetic induction intensity or magnetic flux density) of the second magnetic field within the magnetic gap may exceed the magnetic field strength of the first magnetic field within the magnetic gap. In some embodiments, the second magnetic element 2108 may generate a third magnetic field. The third magnetic field may increase the magnetic field strength of the total magnetic field within the magnetic gap. The third magnetic field increasing the magnetic field strength of the first magnetic field mentioned herein may refer to that the first full magnetic field including the third magnetic field (i.e., when the second magnetic element 2108 exist) has a stronger magnetic field strength than the first full magnetic field not including the third magnetic field (i.e., when the second magnetic element 2108 does not exist). In other embodiments in this disclosure, unless otherwise specified, the magnetic circuit assembly represents a structure including all magnetic elements and magnetic guide elements. The first magnetic field represents the total magnetic field generated by the magnetic circuit assembly as a whole. The second magnetic field, the third magnetic field, . . . , and the Nth magnetic field represent magnetic fields generated by corresponding magnetic elements, respectively. In different embodiments, a magnetic element that generates the second magnetic field (or the third magnetic field, . . . , Nth magnetic field) may be the same, and may be different.

In some embodiments, an included angle between the magnetization direction of the first magnetic element 2102 and the magnetization direction of the second magnetic element 2108 may be in a range from 0 to 180 degrees. In some embodiments, the included angle between the magnetization direction of the first magnetic element 2102 and the magnetization direction of the second magnetic element 2108 may be in a range from 45 degrees to 135 degrees. In some embodiments, the included angle between the magnetization direction of the first magnetic element 2102 and the magnetization direction of the second magnetic element 2108 may be equal to or greater than 90 degrees. In some embodiments, the magnetization direction of the first magnetic element 2102 may be perpendicular to the lower surface or the upper surface of the first magnetic element 2102 and be vertically upward (the direction denoted by arrow a in the figure). The magnetization direction of the second magnetic element 2108 may be directed from the inner ring of the second magnetic element 2108 to the outer ring (the direction denoted by arrow b in the figure, on the right side of the first magnetic element 2102, the magnetization direction of the first magnetic element 2102 deflected 90 degrees in a clockwise direction).

In some embodiments, at a position of the second magnetic element 2108, an included angle between the direction of the total magnetic field and the magnetization direction of the second magnetic element 2108 may not be higher than 90 degrees. In some embodiments, at the position of the second magnetic element 2108, the included angle between the direction of the first magnetic field generated by the first magnetic element 2102 and the magnetization direction of the second magnetic element 2108 may be an included angle that is less than or equal to 90 degrees, such as 0 degrees, 10 degrees, 20 degrees, etc.

Compared with the magnetic circuit assembly including one single magnetic element, the second magnetic element 2108 may increase the total magnetic flux within the magnetic gap in the magnetic circuit assembly 2100, thereby increasing the magnetic induction intensity within the magnetic gap. In addition, under the action of the second magnetic element 2108, the magnetic induction lines that are originally divergent may converge to the position of the magnetic gap, further increasing the magnetic induction intensity within the magnetic gap.

Figure 28:
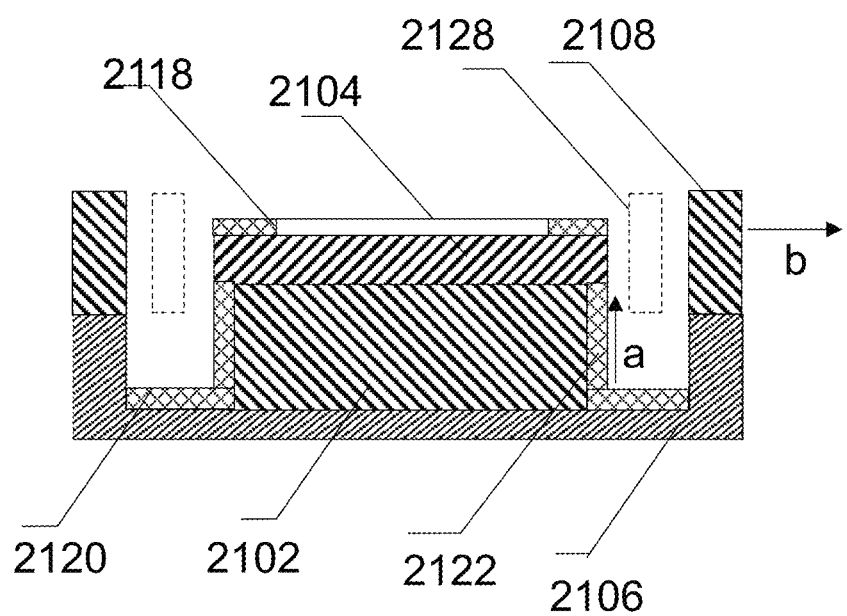
FIG. 28 is a schematic diagram illustrating a longitudinal sectional view of a magnetic circuit assembly 2600 according to some embodiments of the present disclosure.

FIG. 28 is a schematic diagram illustrating a longitudinal sectional view of a magnetic circuit assembly 2600 according to some embodiments of the present disclosure. As shown in FIG. 28, different from the magnetic circuit assembly 2100, the magnetic circuit assembly 2600 may further include one or more conductive elements (e.g., a first conductive element 2118, a second conductive element 2120, and a third conductive element 2122).

The conductive element may include a metal material, a metal alloy material, an inorganic non-metal material, or other conductive materials. The metal material may include a gold, a silver, a copper, an aluminum, etc. The metal alloy material may include an iron-based alloy, an aluminum-based alloy material, a copper-based alloy, a zinc-based alloy, etc. The inorganic non-metal material may include a graphite, etc. The conductive element may be in a sheet shape, an annular shape, a mesh shape, or the like. The first conductive element 2118 may be located on the upper surface of the first magnetic guide element 2104. The second conductive element 2120 may be connected with the first magnetic element 2102 and the second magnetic guide element 2106. The third conductive element 2122 may be connected with the side wall of the first magnetic element 2102. In some embodiments, the first magnetic guide element 2104 may protrude from the first magnetic element 2102 to form a first concave portion, and the third conductive element 2122 may be provided on the first concave portion. In some embodiments, the first conductive element 2118, the second conductive element 2120, and the third conductive element 2122 may include the same or different conductive materials. The first conductive element 2118, the second conductive element 2120, and the third conductive element 2122 may be respectively connected with the first magnetic guide element 2104, the second magnetic guide element 2106 and/or the first magnetic element 2102 through one or more connection means as described elsewhere in the present disclosure.

The magnetic gap may be configured between the first magnetic element 2102, the first magnetic guide element 2104, and the inner ring of the second magnetic element 2108. The voice coil 2128 may be located within the magnetic gap. The first magnetic element 2102, the first magnetic guide element 2104, the second magnetic guide element 2106, and the second magnetic element 2108 may form the magnetic circuit. In some embodiments, the one or more conductive elements may reduce the inductive reactance of the voice coil 2128. For example, if a first alternating current flows into the voice coil 2128, a first alternating induction magnetic field may be generated near the voice coil 2128. Under the action of the magnetic field in the magnetic circuit, the first alternating induction magnetic field may cause the voice coil 2128 to generate inductive reactance and hinder the movement of the voice coil 2128. When the one or more conductive elements (e.g., the first conductive element 2118, the second conductive element 2120, and the third conductive element 2122) are configured near the voice coil 2128, under the action of the first alternating induction magnetic field, the conductive elements may induce a second alternating current. A third alternating current in the conductive elements may generate a second alternating induction magnetic field near the conductive elements. The direction of the second alternating magnetic field may be opposite to the direction of the first alternating induction magnetic field, and the first alternating induction magnetic field may be weakened, thereby reducing the inductive reactance of the voice coil 2128, increasing the current in the voice coil, and improving the sensitivity of the bone conduction speaker.

Figure 29:
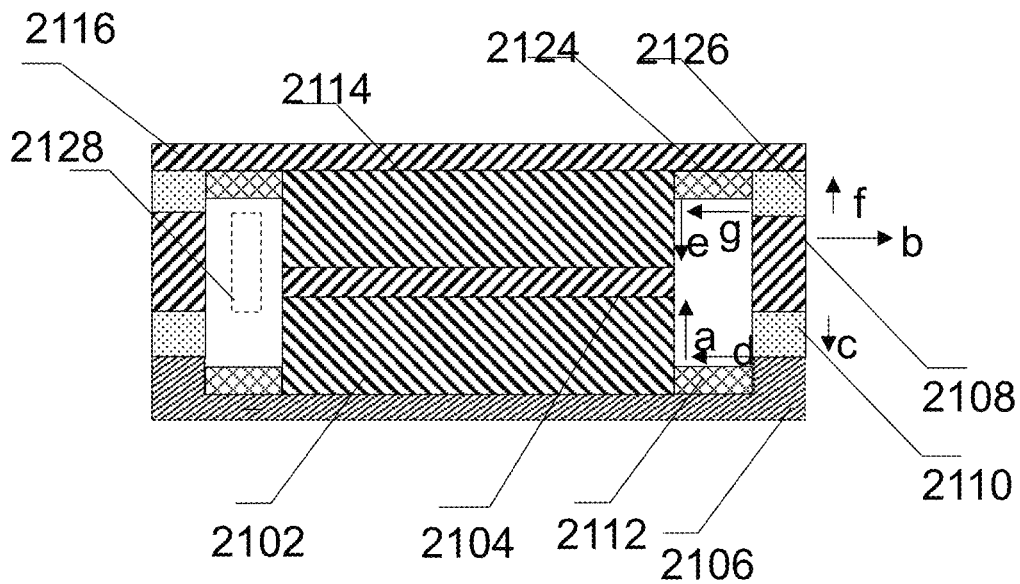
FIG. 29 is a schematic diagram illustrating a longitudinal sectional view of a magnetic circuit assembly 2700 according to some embodiments of the present disclosure

FIG. 29 is a schematic diagram illustrating a longitudinal sectional view of a magnetic circuit assembly 2700 according to some embodiments of the present disclosure. As shown in FIG. 29, different from the magnetic circuit assembly 2500, the magnetic circuit assembly 2700 may further include the third magnetic element 2110, the fourth magnetic element 2112, the fifth magnetic element 2114, the third magnetic guide element 2116, a sixth magnetic element 2124, and a seventh magnetic element 2126. The third magnetic element 2110, the fourth magnetic element 2112, the fifth magnetic element 2114, the third magnetic guide element 2116 and/or the sixth magnetic element 2124, and the seventh magnetic element 2126 may be provided as coaxial circular cylinders.

In some embodiments, the upper surface of the second magnetic element 2108 may be connected with the seventh magnetic element 2126, and the lower surface of the second magnetic element 2108 may be connected with the third magnetic element 2110. The third magnetic element 2110 may be connected with the second magnetic guide element 2106. The upper surface of the seventh magnetic element 2126 may be connected with the third magnetic guide element 2116. The fourth magnetic element 2112 may be connected with the second magnetic guide element 2106 and the first magnetic element 2102. The sixth magnetic element 2124 may be connected with the fifth magnetic element 2114, the third magnetic guide element 2116, and the seventh magnetic element 2126. In some embodiments, the first magnetic element 2102, the first magnetic guide element 2104, the second magnetic guide element 2106, the second magnetic element 2108, the third magnetic element 2110, the fourth magnetic element 2112, the fifth magnetic element 2114, the third magnetic guide element 2116, the sixth magnetic element 2124, and the seventh magnetic element 2126 may form the magnetic circuit and the magnetic gap.

In some embodiments, an included angle between the magnetization direction of the first magnetic element 2102 and the magnetization direction of the sixth magnetic element 2124 may be in a range from 0 to 180 degrees. In some embodiments, the included angle between the magnetization direction of the first magnetic element 2102 and the magnetization direction of the sixth magnetic element 2124 may be in a range from 45 degrees to 135 degrees. In some embodiments, the included angle between the magnetization direction of the first magnetic element 2102 and the magnetization direction of the sixth magnetic element 2124 may not be higher than 90 degrees. In some embodiments, the magnetization direction of the first magnetic element 2102 may be perpendicular to the lower surface or the upper surface of the first magnetic element 2102 vertically upward (the direction denoted by arrow a in the figure). The magnetization direction of the sixth magnetic element 2124 may be directed from the outer ring of the sixth magnetic element 2124 to the inner ring (the direction denoted by arrow g in the figure. On the right side of the first magnetic element 2102, the magnetization direction of the first magnetic element 2102 deflected 270 degrees in a clockwise direction). In some embodiments, in the same vertical direction, the magnetization direction of the sixth magnetic element 2124 may be the same as the magnetization direction of the fourth magnetic element 2112.

In some embodiments, at some positions of the sixth magnetic element 2124, the included angle between the direction of the magnetic field generated by the magnetic circuit assembly 2700 and the magnetization direction of the sixth magnetic element 2124 may not be higher than 90 degrees. In some embodiments, at the position of the sixth magnetic element 2124, the included angle between the direction of the magnetic field generated by the first magnetic element 2102 and the magnetization direction of the sixth magnetic element 2124 may be an included angle that is less than or equal to 90 degrees, such as 0 degrees, 10 degrees, 20 degrees, etc.

In some embodiments, an included angle between the magnetization direction of the first magnetic element 2102 and the magnetization direction of the seventh magnetic element 2126 may be in a range from 0 to 180 degrees. In some embodiments, the included angle between the magnetization direction of the first magnetic element 2102 and the magnetization direction of the seventh magnetic element 2126 may be in a range from 45 degrees to 135 degrees. In some embodiments, the included angle between the magnetization direction of the first magnetic element 2102 and the magnetization direction of the seventh magnetic element 2126 may not be higher than 90 degrees. In some embodiments, the magnetization direction of the first magnetic element 2102 may be perpendicular to the lower surface or the upper surface of the first magnetic element 2102 vertically upward (the direction of denoted by arrow a in the figure). The magnetization direction of the seventh magnetic element 2126 may be directed from the lower surface of the seventh magnetic element 2126 to the upper surface (the direction denoted by arrow f in the figure. On the right side of the first magnetic element 2102, the magnetization direction of the first magnetic element 2102 deflected 360 degrees in a clockwise direction). In some embodiments, the magnetization direction of the seventh magnetic element 2126 may be opposite to the magnetization direction of the third magnetic element 2110.

In some embodiments, at some seventh magnetic element 2126, the included angle between the direction of the magnetic field generated by the magnetic circuit assembly 2700 and the magnetization direction of the seventh magnetic element 2126 may not be higher than 90 degrees. In some embodiments, at the position of the seventh magnetic element 2126, the included angle between the direction of the magnetic field generated by the first magnetic element 2102 and the magnetization direction of the seventh magnetic element 2126 may be an included angle that is less than or equal to 90 degrees, such as 0 degrees, 10 degrees, 20 degrees, etc.

In the magnetic circuit assembly 2700, the third magnetic guide element 2116 may close the magnetic circuit generated by the magnetic circuit assembly 2700, so that more magnetic induction lines are concentrated within the magnetic gap, thereby achieving the effects of suppressing magnetic leakage, increasing magnetic induction intensity within the magnetic gap, and improving the sensitivity of the bone conduction speaker.

Figure 30:
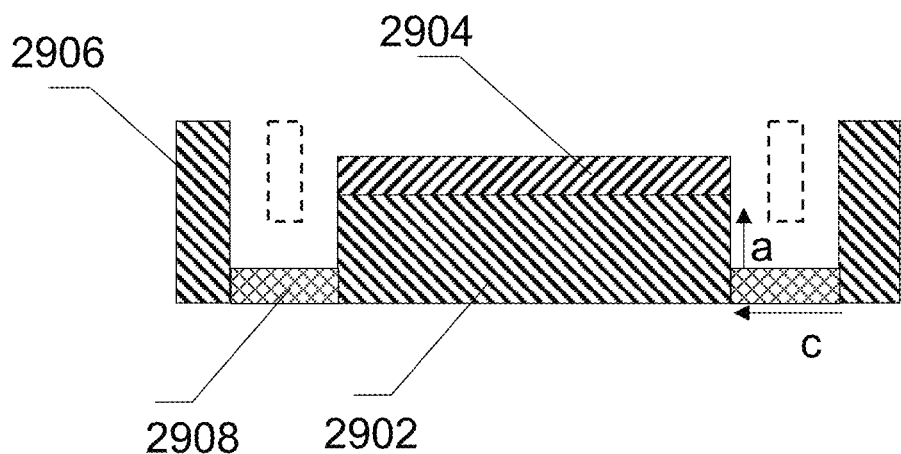
FIG. 30 is a schematic diagram illustrating a longitudinal sectional view of a magnetic circuit assembly 2900 according to some embodiments of the present disclosure.

FIG. 30 is a schematic diagram illustrating a longitudinal sectional view of a magnetic circuit assembly 2900 according to some embodiments of the present disclosure. As shown in FIG. 30, the magnetic circuit assembly 3000 may include a first magnetic element 2902, a first magnetic guide element 2904, a first full magnetic field changing element 2906, and a second magnetic element 2908.

The upper surface of the first magnetic element 2902 may be connected with the lower surface of the first magnetic guide element 2904, and the second magnetic element 2908 may be connected with the first magnetic element 2902 and the first full magnetic field changing element 2906. The connection means between the first magnetic element 2902, the first magnetic guide element 2904, the first full magnetic field changing element 2906, and/or the second magnetic element 2908 may be based on any one or more connection means as described elsewhere in the present disclosure. In some embodiments, the first magnetic element 2902, the first magnetic guide element 2904, the first full magnetic field changing element 2906, and/or the second magnetic element 2908 may form the magnetic circuit and the magnetic gap.

In some embodiments, the magnetic circuit assembly 2900 may generate the first magnetic field, and the first magnetic element 2902 may generate the second magnetic field. The magnetic field strength of the first magnetic field within the magnetic gap may exceed the magnetic field strength of the second magnetic field within the magnetic gap. In some embodiments, the second magnetic element 2908 may generate a third magnetic field, and the third magnetic field may increase the magnetic field strength of the second magnetic field within the magnetic gap.

In some embodiments, the included angle between the magnetization direction of the first magnetic element 2902 and the magnetization direction of the second magnetic element 2908 may be in a range from 0 to 180 degrees. In some embodiments, the included angle between the magnetization direction of the first magnetic element 2902 and the magnetization direction of the second magnetic element 2908 may be in a range from 45 degrees to 135 degrees. In some embodiments, the included angle between the magnetization direction of the first magnetic element 2902 and the magnetization direction of the second magnetic element 2908 may not be higher than 90 degrees.

In some embodiments, at some locations of the second magnetic element 2908, the included angle between the direction of the first magnetic field and the magnetization direction of the second magnetic element 2908 may not be higher than 90 degrees. In some embodiments, at the position of the second magnetic element 2908, the included angle between the direction of the magnetic field generated by the first magnetic element 2902 and the magnetization direction of the second magnetic element 2908 may be an included angle that is less than or equal to 90 degrees, such as 0 degrees, 10 degrees, 20 degrees, etc. As another example, the magnetization direction of the first magnetic element 2902 may be perpendicular to the lower surface or the upper surface of the first magnetic element 2902 vertically upward (the direction denoted by arrow a in the figure). The magnetization direction of the second magnetic element 2908 may be directed from the outer ring of the second magnetic element 408 to the inner ring (the direction denoted by arrow c in the FIG. 4A. On the right side of the first magnetic element 2902, the magnetization direction of the first magnetic element 2902 deflected 270 degrees in a clockwise direction).

Compared with the magnetic circuit assembly of a single magnetic element, the first full magnetic field changing element 2906 in the magnetic circuit assembly 2900 may increase the total magnetic flux within the magnetic gap, thereby increasing the magnetic induction intensity within the magnetic gap. In addition, under the action of the first full magnetic field changing element 2906, the magnetic induction lines that are originally divergent may converge to the position of the magnetic gap, further increasing the magnetic induction intensity within the magnetic gap.

Figure 31:
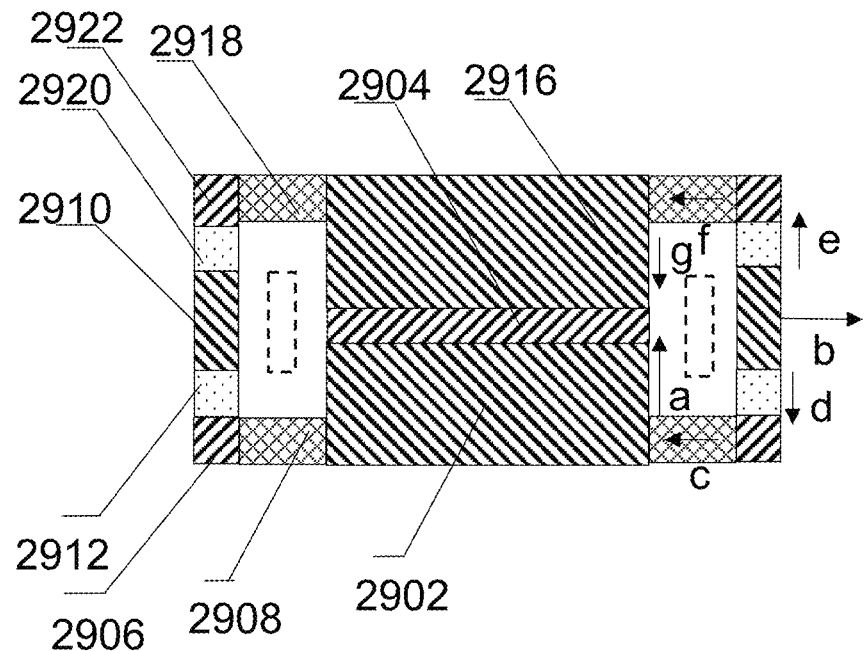
FIG. 31 is a schematic diagram illustrating a longitudinal sectional view of a magnetic circuit assembly 3000 according to some embodiments of the present disclosure.

FIG. 31 is a schematic diagram illustrating a longitudinal sectional view of a magnetic circuit assembly 3000 according to some embodiments of the present disclosure. The magnetic circuit assembly 3000 may include the first magnetic element 2902, the first magnetic guide element 2904, the first full magnetic field changing element 2906, the second magnetic element 2908, the third magnetic element 2910, the fourth magnetic element 2912, the fifth magnetic element 2916, a sixth magnetic element 2918, a seventh magnetic element 2920, and a second ring element 2922. In some embodiments, the first full magnetic field changing element 2906 and/or the second ring element 2922 may include the annular magnetic element or an annular magnetic guide element. The annular magnetic element may include any one or more magnetic materials described in the present disclosure, and the annular magnetic guide element may include any one or more magnetically conductive materials described in the present disclosure.

In some embodiments, the sixth magnetic element 2918 may be connected with the fifth magnetic element 2916 and the second ring element 2922, and the seventh magnetic element 2920 may be connected with the third magnetic element 2910 and the second ring element 2922. In some embodiments, the first magnetic element 2902, the fifth magnetic element 2916, the second magnetic element 2908, the third magnetic element 2910, the fourth magnetic element 2912, the sixth magnetic element 2918, and/or the seventh magnetic element 2920, and the first magnetic guide element 2904, the first full magnetic field changing element 2906, and the second ring element 2922 may form the magnetic circuit.

In some embodiments, the included angle between the magnetization direction of the first magnetic element 2902 and the magnetization direction of the sixth magnetic element 2918 may be in a range from 0 to 180 degrees. In some embodiments, the included angle between the magnetization direction of the first magnetic element 2902 and the magnetization direction of the sixth magnetic element 2918 may be in a range from 45 degrees to 135 degrees. In some embodiments, the included angle between the magnetization direction of the first magnetic element 2902 and the magnetization direction of the sixth magnetic element 2918 may not be higher than 90 degrees. In some embodiments, the magnetization direction of the first magnetic element 2902 may be perpendicular to the lower surface or the upper surface of the first magnetic element 2902 vertically upward (the direction denoted by arrow a in the figure). The magnetization direction of the sixth magnetic element 2918 may be directed from the outer ring of the sixth magnetic element 2918 to the inner ring (the direction denoted by arrow f in the figure. On the right side of the first magnetic element 2902, the magnetization direction of the sixth magnetic element 2918 may be same as the magnetization direction of the first magnetic element 2902 deflected 270 degrees in a clockwise direction). In some embodiments, in the same vertical direction, the magnetization direction of the sixth magnetic element 2918 may be the same as the magnetization direction of the second magnetic element 2908. In some embodiments, the magnetization direction of the first magnetic element 2902 may be perpendicular to the lower surface or the upper surface of the first magnetic element 2902 vertically upward (the direction denoted by arrow a in the figure). The magnetization direction of the seventh magnetic element 2920 may be directed from the lower surface of the seventh magnetic element 2920 to the upper surface (the direction denoted by arrow e in the figure. On the right side of the first magnetic element 2902, the magnetization direction of the first magnetic element 2902 deflected 360 degrees in a clockwise direction). In some embodiments, the magnetization direction of the seventh magnetic element 2920 may be the same as the magnetization direction of the third magnetic element 2912.

In some embodiments, at the position of the sixth magnetic element 2918, the included angle between the direction of the magnetic field generated by the magnetic circuit assembly 3000 and the magnetization direction of the sixth magnetic element 2918 may not be higher than 90 degrees. In some embodiments, at the position of the sixth magnetic element 2918, the included angle between the direction of the magnetic field generated by the first magnetic element 2902 and the magnetization direction of the sixth magnetic element 2918 may be an included angle that is less than or equal to 90 degrees, such as 0 degrees, 10 degrees, 20 degrees, etc.

In some embodiments, the included angle between the magnetization direction of the first magnetic element 2902 and the magnetization direction of the seventh magnetic element 2920 may be in a range from 0 to 180 degrees. In some embodiments, the included angle between the magnetization direction of the first magnetic element 2902 and the magnetization direction of the seventh magnetic element 2920 may be in a range from 45 degrees to 135 degrees. In some embodiments, the included angle between the magnetization direction of the first magnetic element 2902 and the magnetization direction of the seventh magnetic element 2920 may not be higher than 90 degrees.

In some embodiments, at the position of the seventh magnetic element 2920, the included angle between the direction of the magnetic field generated by the magnetic circuit assembly 3000 and the magnetization direction of the seventh magnetic element 2920 may not be higher than 90 degrees. In some embodiments, at the position of the seventh magnetic element 2920, the included angle between the direction of the magnetic field generated by the first magnetic element 2902 and the magnetization direction of the seventh magnetic element 2920 may be an included angle that is less than or equal to 90 degrees, such as 0 degrees, 10 degrees, 20 degrees, etc.

In some embodiments, the first full magnetic field changing element 2906 may be the annular magnetic element. In this case, the magnetization direction of the first full magnetic field changing element 2906 may be the same as the magnetization direction of the second magnetic element 2908 or the fourth magnetic element 2912. For example, on the right side of the first magnetic element 2902, the magnetization direction of the first full magnetic field changing element 2906 may be directed from the outer ring of the first full magnetic field changing element 2906 to the inner ring. In some embodiments, the second ring element 2922 may be the annular magnetic element. In this case, the magnetization direction of the second ring element 2922 may be the same as that of the sixth magnetic element 2918 or the seventh magnetic element 2920. For example, on the right side of the first magnetic element 2902, the magnetization direction of the second ring element 2922 may be directed from the outer ring of the second ring element 2922 to the inner ring.

In the magnetic circuit assembly 3000, a plurality of magnetic elements may increase the total magnetic flux, the interaction of the different magnetic elements may suppress the leakage of magnetic induction lines, increase magnetic induction intensity within the magnetic gap, and improve the sensitivity of the bone conduction speaker.

Figure 32:
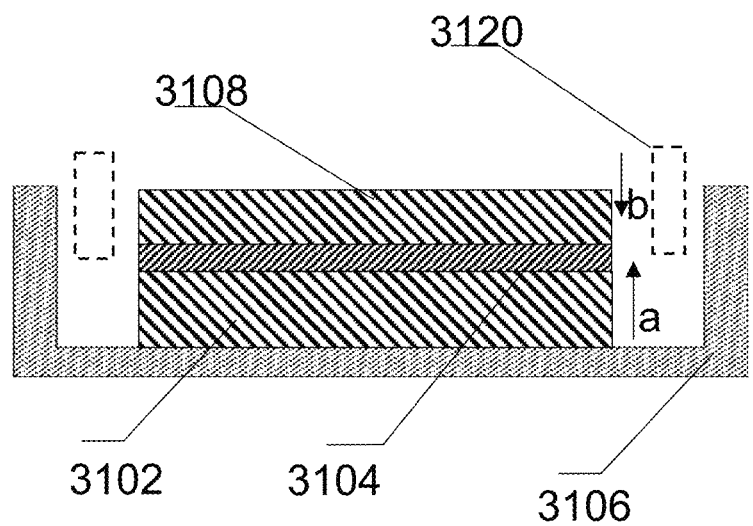
FIG. 32 is a schematic diagram illustrating a longitudinal sectional view of a magnetic circuit assembly 3100 according to some embodiments of the present disclosure.

FIG. 32 is a schematic diagram illustrating a longitudinal sectional view of a magnetic circuit assembly 3100 according to some embodiments of the present disclosure. As shown in FIG. 32, the magnetic circuit assembly 3100 may include a first magnetic element 3102, a first magnetic guide element 3104, a second magnetic guide element 3106, and a second magnetic element 3108.

In some embodiments, the first magnetic element 3102 and/or the second magnetic element 3108 may include any one or more magnets described in the present disclosure. In some embodiments, the first magnetic element 3102 may include the first magnet, and the second magnetic element 3108 may include the second magnet. The first magnet may be the same as or different from the second magnet. The first magnetic guide element 3104 and/or the second magnetic guide element 3106 may include any one or more magnetic conductive materials described in the present disclosure. The processing means of the first magnetic guide element 3104 and/or the second magnetic guide element 3106 may include any one or more processing means as described elsewhere in the present disclosure. In some embodiments, the first magnetic element 3102, the first magnetic guide element 3104, and/or the second magnetic element 3108 may be provided as the axisymmetric structure. For example, the first magnetic element 3102, the first magnetic guide element 3104, and/or the second magnetic element 3108 may be cylinders. In some embodiments, the first magnetic element 3102, the first magnetic guide element 3104, and/or the second magnetic element 3108 may be coaxial cylinders with the same or different diameters. The thickness of the first magnetic element 3102 may exceed or equal to the thickness of the second magnetic element 3108. In some embodiments, the second magnetic guide element 3106 may be the groove-type structure. The groove-type structure may include the U-shaped cross section. The groove-type second magnetic guide element 3106 may include the baseplate and the side wall. In some embodiments, the baseplate and the side wall may be integrally formed. For example, the side wall may be formed by extending the baseplate in the direction perpendicular to the baseplate. In some embodiments, the baseplate may be connected with the side wall through one or more connection means as described elsewhere in the present disclosure. The second magnetic element 3108 may be provided in the annular shape or the sheet shape. Regarding the shape of the second magnetic element 3108, reference may be made to descriptions elsewhere in the specification. In some embodiments, the second magnetic element 3108 may be coaxial with the first magnetic element 3102 and/or the first magnetic guide element 3104.

The upper surface of the first magnetic element 3102 may be connected with the lower surface of the first magnetic guide element 3104. The lower surface of the first magnetic element 3102 may be connected with the baseplate of the second magnetic guide element 3106. The lower surface of the second magnetic element 3108 may be connected with the upper surface of the first magnetic guide element 3104. The connection means between the first magnetic element 3102, the first magnetic guide element 3104, the second magnetic guide element 3106 and/or the second magnetic element 3108 may include the bonding, the snapping, the welding, the riveting, the bolting, or the like, or any combination thereof.

The magnetic gap may be configured between the first magnetic element 3102, the first magnetic guide element 3104, and/or the second magnetic element 3108 and the side wall of the second magnetic guide element 3106. The voice coil may be disposed within the magnetic gap. In some embodiments, the first magnetic element 3102, the first magnetic guide element 3104, the second magnetic guide element 3106, and the second magnetic element 3108 may form the magnetic circuit. In some embodiments, the magnetic circuit assembly 3100 may generate the first magnetic field, and the first magnetic element 3102 may generate the second magnetic field. The first magnetic field may be jointly formed by magnetic fields generated by all components (e.g., the first magnetic element 3102, the first magnetic guide element 3104, the second magnetic guide element 3106, and the second magnetic element 3108) in the magnetic circuit assembly 3100. The magnetic field strength of the first magnetic field within the magnetic gap (may also be referred to as magnetic induction intensity or magnetic flux density) may exceed the magnetic field strength of the second magnetic field within the magnetic gap. In some embodiments, the second magnetic element 3108 may generate the third magnetic field, and the third magnetic field may increase the magnetic field strength of the second magnetic field within the magnetic gap.

In some embodiments, the included angle between the magnetization direction of the second magnetic element 3108 and the magnetization direction of the first magnetic element 3102 may be in a range from 90 degrees to 180 degrees. In some embodiments, the included angle between the magnetization direction of the second magnetic element 3108 and the magnetization direction of the first magnetic element 3102 may be in a range from 150 degrees to 180 degrees. In some embodiments, the magnetization direction of the second magnetic element 3108 may be opposite to the magnetization direction of the first magnetic element 3102 (as shown in the figure, in the direction of a and in the direction of b).

Compared with the magnetic circuit assembly of the single magnetic element, the magnetic circuit assembly 3100 may add the second magnetic element 3108. The magnetization direction of the second magnetic element 3108 may be opposite to the magnetization direction of the first magnetic element 3102, which can suppress the magnetic leakage of the first magnetic element 3102 in the magnetization direction, so that the magnetic field generated by the first magnetic element 3102 may be more compressed into the magnetic gap, thereby increasing the magnetic induction intensity within the magnetic gap.

It should be noted that, the above description of the speaker may be only a specific example, and should not be considered as the only feasible implementation. Obviously, for skilled in the art, after understanding the basic principles of the speaker, it is possible to make various modifications and changes in the form and details of the specific means and steps of implementing the speaker without departing from this principle, but these modifications and changes are still within the scope described above. For example, magnetic elements in the magnetic circuit assembly may not be limited to the first magnetic element, the second magnetic element, the third magnetic element, the fourth magnetic element, the fifth magnetic element, the sixth magnetic element, the seventh magnetic element. The number of the magnetic element may be added or reduced. All such modifications are within the protection scope of the present disclosure.

In some embodiments, the speaker described above may transmit the sound to the user through bone conduction and/or air conduction. When the air conduction is used to transmit the sound, the speaker may include one or more sound sources. The sound source may be located at a specific position of the user's head, for example, the top of the head, the forehead, a cheek, a temple, an auricle, the back of an auricle, etc., without blocking or covering an ear canal. For the purposes of description, FIG. 33 shows a schematic diagram of transmitting the sound through the air conduction according to some embodiments of the present disclosure.

Figure 33:
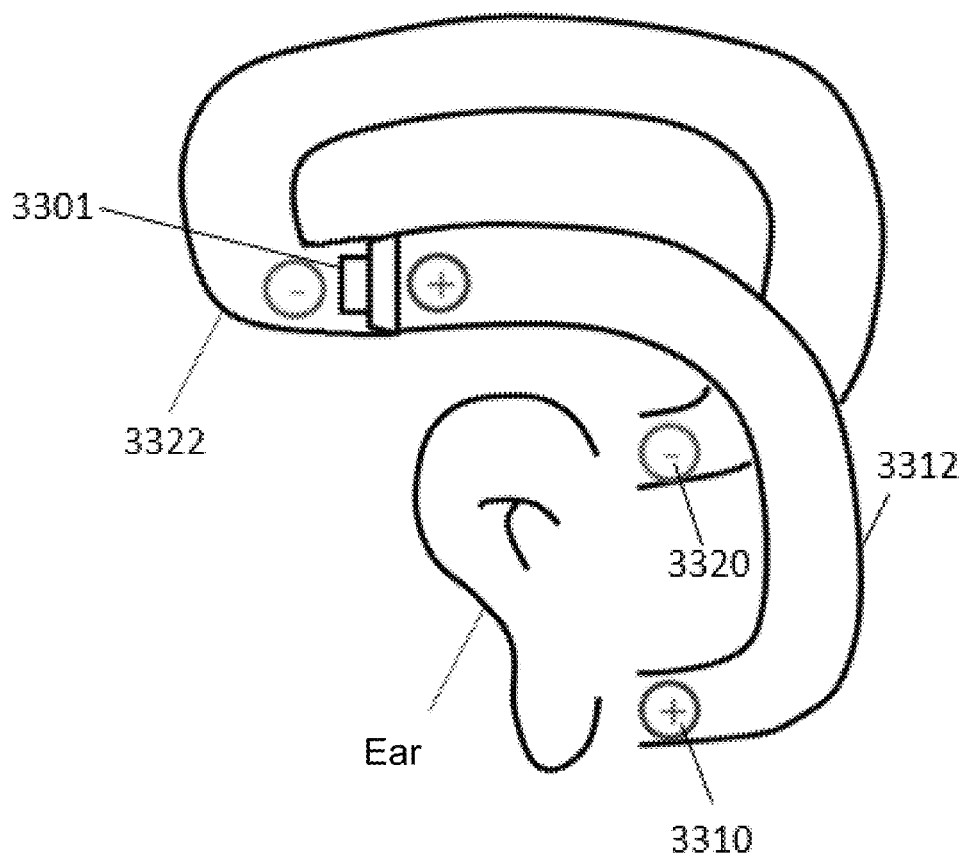
FIG. 33 is a schematic diagram of transmitting sound through air conduction according to some embodiments of the present disclosure.

As shown in FIG. 33, a sound source 3310 and a sound source 3320 may generate sound waves with opposite phases ("+" and "−" in the figure may indicate the opposite phases). For brevity, the sound sources mentioned herein may refer to sound outlets of the speaker that may output sounds. For example, the sound source 3310 and the sound source 3320 may be two sound outlets respectively located at specific positions of the speaker (e.g., the housing 104 in FIG. 16 or the circuit housing).

In some embodiments, the sound source 3310 and the sound source 3320 may be generated by a same vibration device 3301. The vibration device 3301 may include a diaphragm (not shown in the figure). When the diaphragm is driven to vibrate by an electric signal, the front side of the diaphragm may drive the air to vibrate. The sound source 3310 may form at the sound outlet through a sound guiding channel 3312. The back of the diaphragm may drive air to vibrate, and the sound source 3320 may be formed at the sound outlet through a sound guiding channel 3322. The sound guiding channel may refer to a sound transmission route from the diaphragm to the corresponding outlet. In some embodiments, the sound guiding channel may be a route surrounded by a specific structure (e.g., the housing 104 in FIG. 16 or the circuit housing) of a speaker. It should be known that in some alternative embodiments, the sound source 3310 and the sound source 3320 may also be generated by different vibrating diaphragms of different vibration devices, respectively.

Among the sounds generated by the sound source 3310 and the sound source 3320, one part may be transmitted to the ears of the user to form the sound heard by the user. Another part may be transmitted to the environment to form a leaked sound. Considering that the sound source 3310 and the sound source 3320 are closer to the ears of the user, for the convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker may be related to a distance between the sound source 3310 and the sound source 3320. Generally speaking, the near-field sound generated by the speaker may increase as the distance between the two sound sources increases, while the generated far-field sound (the leaked sound) may increase by increasing the frequency.

For the sounds of different frequencies, the distance between the sound source 3310 and the sound source 3320 may be designed, respectively, so that a low-frequency near-field sound (e.g., a sound with a frequency of less than 800 Hz) generated by the speaker may be as large as possible and a high-frequency far-field sound (e.g., a sound with a frequency greater than 2000 Hz) may be as small as possible. In order to implement the above purposes, the speaker may include two or more sets of dual sound sources. Each set of the dual sound sources may include two sound sources similar to the sound source 3310 and the sound source 3320, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between the two sound sources in the first set of the dual sound sources may be set as a larger value. Since the low-frequency signal may have a longer wavelength, the larger distance between the two sound sources may not cause a large phase difference in the far-field, and not form excessive leaked sounds in the far-field. In order to make the high-frequency far-field sound smaller, the distance between the two sound sources in the second set of the dual sound sources may be set as a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the embodiments of the present disclosure may include but are not limited to the following. (1) In the present disclosure, when the hinge arm is rotated relative to the hinge mount by an external force, the hinge may change abruptly in an appropriate level, thereby providing convenience for users. (2) The sound quality of the speaker may be improved by adjusting the included angle between the normal line A of the panel 103 or the normal line A' of the contact surface between the panel and the human skin and the straight line B where the device driving force is along. (3) The housing panel and the housing back may maintain a same or substantially same vibration amplitude and phase at a higher frequency by improving the rigidity of the entire housing, thereby significantly reducing the sound leakage of the speaker. (4) The sensitivity of the speaker may be increased by adding the magnetic element, the magnetic guide element, and the conductive element. It should be noted that different embodiments may have different beneficial effects. In different embodiments, possible beneficial effects may be any one or a combination of the above, and may be any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. A glasses, comprising:
    a glasses frame, the glasses frame comprising a glasses rim and two glasses temples, and the two glasses temples being rotatably connected to the glasses rim, respectively; and
    two speakers, the two speakers being connected to the two glasses temples via hinge components of the two glasses temples, respectively, and the hinge components being rotatable to change a position of each of the two speakers relative to one of the two glasses temples, the two speakers comprising an earphone core and an earphone housing, the earphone housing including a housing panel facing a human body and a housing back opposite to the housing panel; and
    at least one of the glasses temples including a control circuit or a battery, the control circuit or the battery driving the earphone core to vibrate to generate sound, a vibration of the earphone core resulting in vibrations of the housing panel and the housing back, the vibration of the housing panel having a first phase, the vibration of the housing back having a second phase, wherein when vibration frequencies of the housing panel and the housing back are in a range of 2000 Hz to 3000 Hz,
        an absolute value of a difference between the first phase and the second phase is less than 60 degrees.

2. The glasses of claim 1, wherein the hinge component includes a hinge, a rod-shaped member, and a fixing member, and the hinge includes:
    a hinge mount;
    a hinge arm rotatably connected to the hinge mount via a rotating shaft, and being rotatable relative to the hinge mount when an external force is applied to the hinge arm to change the position of the speaker relative to the glass temple;
    a support member flexibly disposed on the hinge mount; and
    an elastic member configured to elastically offset the support member toward the hinge arm, so that the support member elastically abuts on the hinge arm.

3. The glasses of claim 2, wherein
    the hinge arm includes a first support surface and a second support surface connected to each other;
    the support member includes a third support surface;
    when the elastic member elastically offsets the support member toward the hinge arm, the third support surface elastically abuts on the first support surface and the second support surface, respectively; and
    when the hinge arm is rotated relative to the hinge mount by the external force, a connection between the first support surface and the second support surface drives the support member against the elastic offset of the elastic member to move in an opposite direction, so that the third support surface is switched from being elastically abutting on one of the first support surface and the second support surface to being elastically abutting on the other of the first support surface and the second support surface.

4. The glasses of claim 3, wherein a ratio between a maximum distance from the rotating shaft to the connection and a shortest distance from the rotating shaft to the first support surface is between 1.1 and 1.5 in a section perpendicular to a central axis of the rotating shaft.

5. The glasses of claim 3, wherein
    the hinge mount includes a mount body, and a first lug and a second lug protruding from the mount body and spaced from each other; and
    the hinge arm includes an arm body and a third lug protruding from the arm body, the third lug is inserted into an interval region between the first lug and the second lug, and rotatably connected to the first lug and the second lug via the rotating shaft.

6. The glasses of claim 1, wherein
    the vibration of the housing panel has a first amplitude;
    the vibration of the housing back has a second amplitude; and
    a ratio of the first amplitude to the second amplitude is in a range of 0.5 to 1.5.

7. The glasses of claim 1, wherein
    the vibration of the housing panel generates a first leakage sound wave;
    the vibration of the housing back generates a second leakage sound wave; and
    the first leakage sound wave and the second leakage sound wave overlap each other, the overlap reducing an amplitude of the first leakage sound wave.

8. The glasses of claim 1, wherein the housing panel is connected to another portion of the earphone housing by at least one of glue, clamping, welding, or screw connection.

9. The glasses of claim 1, wherein the housing panel and the housing back are made of a fiber reinforced plastic material.

10. The glasses of claim 1, wherein the vibration of the earphone core is capable of generating a driving force;
the housing panel is connected to the earphone core in a transmission manner;
the whole or part of the housing panel contacts with or abuts on a user's body to transmit sound; and
a region on the housing panel contacting or abutting on the user's body has a normal line, a line where the driving force is along being not parallel to the normal line.

11. The glasses of claim 10, wherein if the line where the driving force is along has a positive direction pointing out of the speaker through the housing panel, and the normal line has a positive direction pointing out of the speaker, an included angle between the line and the normal line in the positive direction is an acute angle.

12. The glasses of claim 10, wherein the earphone core includes a coil and a magnetic circuit system, an axis of the coil and the magnetic circuit system being not parallel to the normal line; and
the axis is perpendicular to a radial plane of the coil or a radial plane of the magnetic circuit system.

13. The glasses of claim 10, wherein the driving force has components in a first quadrant or a third quadrant of a plane coordinate system XOY, wherein
an origin o of the plane coordinate system XOY is located on a contact surface between the speaker and a human body, an X-axis of the plane coordinate system XOY is parallel to a coronal axis of the human body, a Y-axis of the plane coordinate system XOY is parallel to a sagittal axis of the human body, a positive direction of the X-axis faces toward outside of the human body, and a positive direction of the Y-axis faces toward front of the human body.

14. The glasses of claim 10, wherein a region on the housing panel contacting with or abutting on the user's body includes a plane or a quasi-plane.

15. The glasses of claim 1, wherein the earphone core further includes a magnetic circuit assembly generating a first magnetic field, and the magnetic circuit assembly including:
a first magnetic element generating a second magnetic field;
a first magnetic guide element; and
at least one second magnetic element configured to surround the first magnetic element, a magnetic gap being configured between the at least one second magnetic element and the first magnetic element, wherein a magnetic field strength of the first magnetic field within the magnetic gap exceeds a magnetic field strength of the second magnetic field within the magnetic gap.

16. The glasses of claim 15, further comprising:
a second magnetic guide element; and
at least one third magnetic element connected with the second magnetic guide element and the at least one second magnetic element.

17. The glasses of claim 16, further comprising:
at least one fourth magnetic element located below the magnetic gap, wherein the at least one fourth magnetic element is connected with the first magnetic element and the second magnetic guide element.

18. The glasses of claim 17, further comprising:
at least one fifth magnetic element connected with an upper surface of the first magnetic guide element.

19. The glasses of claim 18, further comprising:
a third magnetic guide element connected with an upper surface of the fifth magnetic element, wherein the third magnetic guide element is configured to suppress leakage of a field strength of the first magnetic field.

20. The glasses of claim 16, further comprising:
at least one conductive element connected with at least one of the first magnetic element, the first magnetic guide element, or the second magnetic guide element.

* * * * *